(12) United States Patent
Tanushi et al.

(10) Patent No.: US 7,907,847 B2
(45) Date of Patent: *Mar. 15, 2011

(54) OPTICAL INTEGRATED CIRCUIT APPARATUS

(75) Inventors: Yuichiro Tanushi, Hiroshima (JP); Shin Yokoyama, Hiroshima (JP); Masato Suzuki, Hiroshima (JP); Yoshiteru Amemiya, Hiroshima (JP)

(73) Assignee: Hiroshima University, Hiroshima (JP)

( * ) Notice: Subject to any disclaimer, the term of this patent is extended or adjusted under 35 U.S.C. 154(b) by 247 days.

This patent is subject to a terminal disclaimer.

(21) Appl. No.: 12/328,341

(22) Filed: Dec. 4, 2008

(65) Prior Publication Data

US 2009/0304390 A1    Dec. 10, 2009

(30) Foreign Application Priority Data

Jun. 9, 2008   (JP) ................................. 2008-150335

(51) Int. Cl.
*H04B 10/00* (2006.01)

(52) U.S. Cl. ........................... 398/139; 398/138; 398/45

(58) Field of Classification Search .................... 398/45, 398/135–139, 164; 385/4, 14, 27, 50
See application file for complete search history.

(56) References Cited

U.S. PATENT DOCUMENTS

| | | | | |
|---|---|---|---|---|
| 6,522,794 B1* | 2/2003 | Bischel et al. | ...................... | 385/4 |
| 6,634,812 B2* | 10/2003 | Ozeki et al. | .................... | 398/164 |
| 6,751,368 B2* | 6/2004 | Lim et al. | ......................... | 385/14 |
| 7,043,115 B2* | 5/2006 | Frick | ............................... | 385/27 |
| 7,366,368 B2* | 4/2008 | Morrow et al. | .................. | 385/15 |
| 2002/0039470 A1* | 4/2002 | Braun et al. | ..................... | 385/50 |
| 2004/0022474 A1* | 2/2004 | Lim et al. | ........................... | 385/4 |
| 2007/0258714 A1* | 11/2007 | Little et al. | ........................ | 398/76 |
| 2009/0103929 A1* | 4/2009 | Binkert et al. | ................. | 398/154 |

FOREIGN PATENT DOCUMENTS

| | | |
|---|---|---|
| JP | 61-070509 | 4/1986 |
| JP | 05-067770 | 3/1993 |
| JP | 2007-013893 | 1/2007 |

OTHER PUBLICATIONS

Office Action for Japanese Application No. 2008-150335 mailed Jun. 23, 2009 (with English translation).
Office Action for Japanese Application No. 2008-150335 mailed Sep. 15, 2009 (with English translation).
Amemiya, Y. et al., "Photoelastic Effect in Silicon Ring Resonators," *Japanese Journal of Applied Physics*, vol. 47, No. 4, 2008, pp. 2910-2914.

(Continued)

*Primary Examiner* — Li Liu
(74) *Attorney, Agent, or Firm* — Foley & Lardner LLP

(57) ABSTRACT

Optical waveguides and optical transceivers are formed on one main surface of a semiconductor substrate. A light source is provided on one side surface of the semiconductor substrate, and emits light to the optical waveguides. In each of the optical transceivers, when a voltage is applied to a silicon layer, an optical resonator resonates with any one of the light components traveling through the optical waveguides, and emits the light component to an optical transmission member. In addition, in each of the optical transceivers, when a voltage is applied to the silicon layer, another optical resonators resonate with light traveling through the optical transmission member and emit the resonance light to photodetectors, respectively.

11 Claims, 18 Drawing Sheets

OTHER PUBLICATIONS

Suzuki, M. et al., "Structural and Optical Properties of Electro-Optic Material: Sputtered $(Ba,Sr)TiO_3$," *Japanese Journal of Applied Physics*, vol. 45, No. 4B, 2006, pp. 3488-3492.

Tanushi, Y. et al., "Compact Multimode Optical Ring Resonators for Interconnection on Silicon Chips," *Journal of Applied Physics*, vol. 46, No. 4B, 2007, pp. 2364-2368.

Tokunaga, T. et al., "Electric-Field Drie Optical Modulator Using Si Ring Resonator," Extended Abstracts (The 55$^{th}$ Spring Meeting, 2008), *The Japan Society of Applied Physics and Related Societies*, No. 3, Mar. 27, 2008, p. 1241 (with partial English translation).

Yokoyama, S. "Optical Interconnection Techniques for LSI," *Applied Physics*, vol. 76, No. 11, 2007, pp. 1238-1245 (with partial English translation).

* cited by examiner

FIG. 3
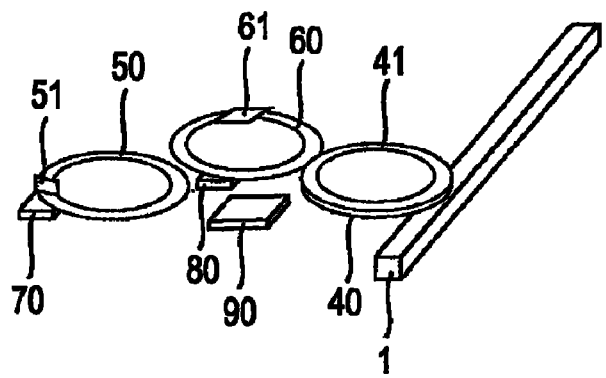
FIG. 4
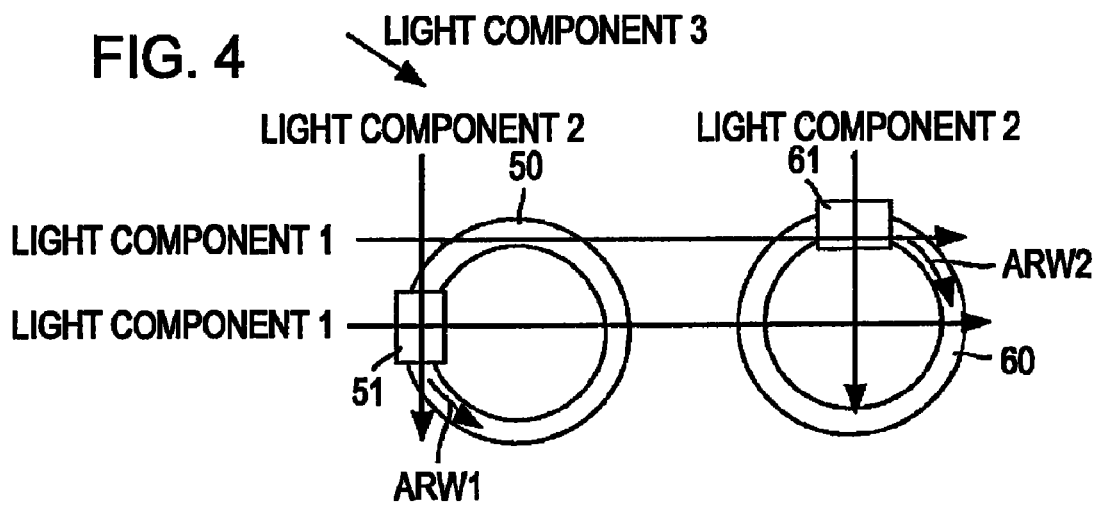
FIG. 5 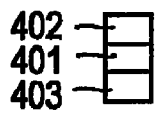 

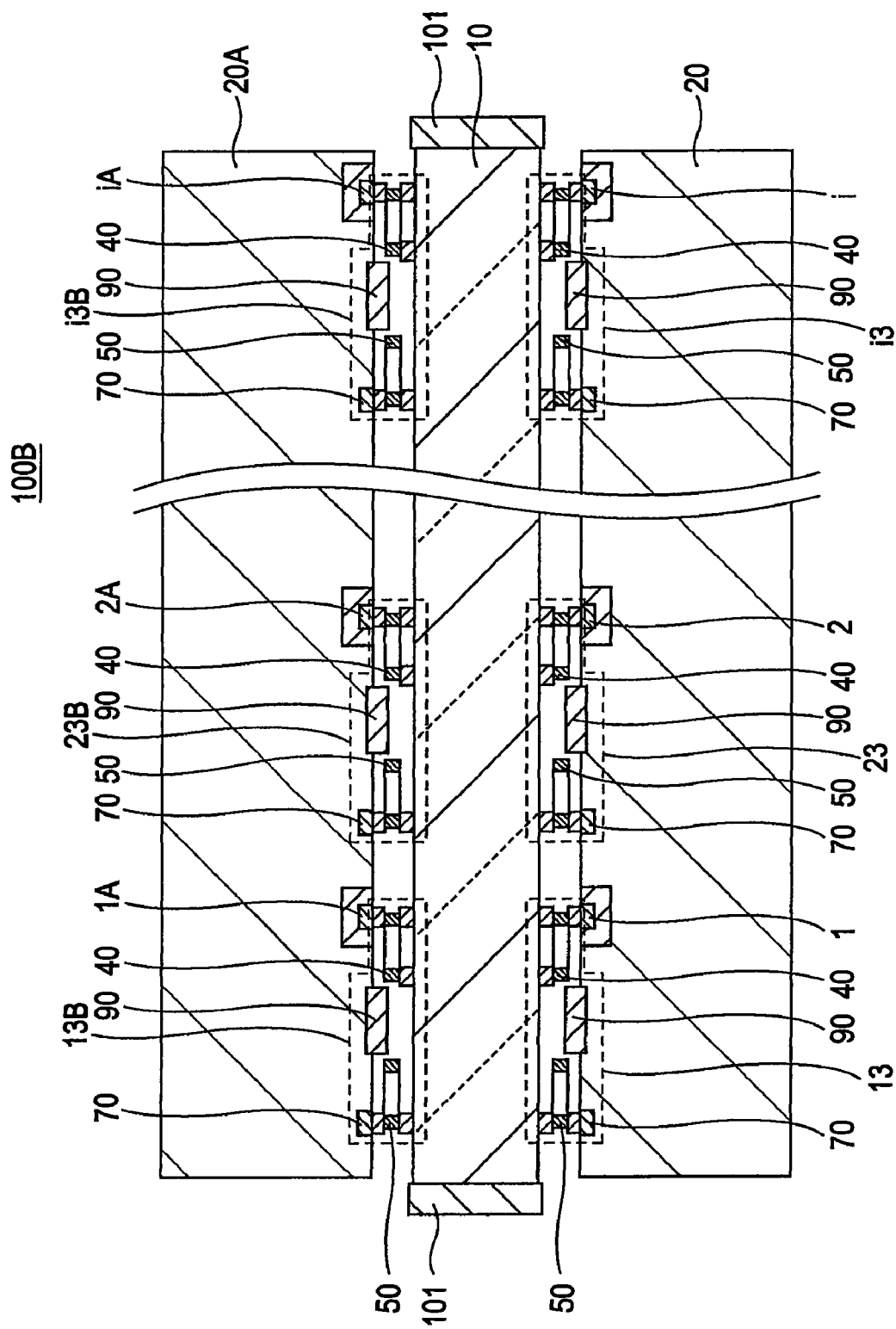

OPTICAL INTEGRATED CIRCUIT APPARATUS

CROSS-REFERENCE TO RELATED APPLICATION

This application claims priority from Japanese Patent Application No. 2008-150335 filed Jun. 9, 2008, the entire disclosure of which is incorporated herein by reference.

BACKGROUND

1. Field

The present disclosure relates to an optical integrated circuit apparatus, and more particularly, to an optical integrated circuit apparatus capable of directly performing optical communication among a plurality of optical transceivers or an optical integrated circuit apparatus capable of arbitrarily performing optical communication among a plurality of optical transceivers at the same time.

2. Description of the Related Art

An opto-electronic integrated circuit apparatus has been proposed (JP-A-5-67770). The opto-electronic integrated circuit apparatus includes an optical wiring substrate, a plurality of opto-electronic IC (integrated circuit) chips, and a plurality of optical waveguides.

The plurality of opto-electronic IC chips are discretely arranged on the optical wiring substrate. Each of the plurality of optical waveguides is arranged between two adjacent opto-electronic IC chips.

Two adjacent opto-electronic IC chips transmit or receive optical signals through the optical waveguide interposed therebetween.

In the opto-electronic integrated circuit apparatus according to the related art, only two adjacent opto-electronic IC chips are connected to each other with the optical waveguide interposed therebetween. Therefore, it is difficult to directly perform optical communication between two arbitrary opto-electronic IC chips.

In addition, in the opto-electronic integrated circuit apparatus according to the related art, the optical waveguides are switched by an optical switch to perform optical communication between arbitrary opto-electronic IC chips in time series. However, it is difficult to perform optical communication between arbitrary opto-electronic IC chips at the same time.

SUMMARY

Accordingly, a representative embodiment provides an optical integrated circuit apparatus capable of directly performing communication between two arbitrary optical transceivers.

A representative embodiment also provides an optical integrated circuit apparatus capable of performing communication between two arbitrary optical transceivers at the same time.

A representative an optical integrated circuit apparatus includes an optical transmission member, a plurality of optical transceivers, and an optical waveguide. The optical transmission member transmits light. The plurality of optical transceivers perform signal communication with each other by using the optical transmission member as a common optical transmission path. The optical waveguide guides light emitted from a light source. Each of the plurality of optical transceivers includes a photodetector and an optical switch member. The photodetector detects light traveling through the optical transmission member. The optical switch member is formed of silicon to which stress is applied, guides the light traveling through the optical waveguide to the optical transmission member, and guides the light traveling through the optical transmission member to the photodetector.

Preferably, the plurality of optical transceivers transmit light components having different wavelengths to the optical transmission member to perform signal communication with each other.

Preferably, the light emitted from the light source includes a plurality of light components having a plurality of discrete wavelengths or a continuous wavelength in a predetermined range. The optical switch member includes a first and second optical resonators. The first optical resonator guides, when a voltage is applied, one light component having an arbitrary wavelength, among a plurality of light components traveling through the optical waveguide, from the optical waveguide to the optical transmission member by optical resonance. The second optical resonator guides, when a voltage is applied, the light traveling through the optical transmission member to the photodetector by optical resonance.

Preferably, the second optical resonator includes a first and second light incident members. The first light incident member has a first light incident window on which the light traveling through the optical transmission member is incident. The second light incident member has a second light incident window on which the light traveling through the optical transmission member is incident. The first light incident window is arranged at an angle of 90 degrees with respect to the second light incident window.

Preferably, each of the plurality of optical transceivers further includes a signal processing circuit. The signal processing circuit transmits signals through the optical transmission member by applying a voltage to the first optical resonator and by applying no voltage thereto, and receives signals through the optical transmission member by applying a voltage to the second optical resonator and by applying no voltage thereto.

Preferably, each of the first and second optical resonators has a ring shape.

Preferably, the optical waveguide is formed on one main surface of a semiconductor substrate. The photodetector is formed on the one main surface of the semiconductor substrate so as to be spaced from the optical waveguide. The first optical resonator is formed on the optical waveguide so as to contact the optical waveguide, and is arranged adjacent to the optical transmission member. The second optical resonator is formed on the photodetector so as to contact the photodetector, and is arranged adjacent to the optical transmission member. Each of the first and second optical resonators includes a silicon layer, a first stress applying layer, and a second stress applying layer. The first stress applying layer is formed to contact one surface of the silicon layer, and applies stress to the silicon layer in a first direction in the plane of the semiconductor substrate. The second stress applying layer is formed to contact the other surface of the silicon layer, and applies stress to the silicon layer in a second direction that is opposite to the first direction in the plane of the semiconductor substrate.

Preferably, the first stress applying layer is a silicon nitride layer, and the second stress applying layer is a silicon oxide layer.

Preferably, the optical transmission member is formed of a transparent material having a refractive index that is larger than that of air.

Preferably, the optical transmission member is formed of any one of SiN, $SiO_2$, SiON, resist, and plastic.

Another representative optical integrated circuit apparatus includes an optical transmission member and a semiconductor substrate. The optical transmission member transmits light. The semiconductor substrate is arranged adjacent to the optical transmission member. The semiconductor substrate includes i (i is a positive integer) optical waveguides, i first optical resonator groups, i photodetector groups, i second optical resonator groups, and i signal processing circuit groups. The i (i is a positive integer) optical waveguides are formed on one main surface facing the optical transmission member and guide light emitted from a light source. The i first optical resonator groups are provided to correspond to the i optical waveguides and are formed on the corresponding optical waveguides so as to contact the optical waveguides. The i photodetector groups are provided to correspond to the i optical waveguides. The i second optical resonator groups are provided to correspond to the i optical waveguides, and are formed on the corresponding photodetector groups so as to contact the photodetector groups. The i signal processing circuit groups are provided to correspond to the i optical waveguides. Each of the i first optical resonator groups includes j (j is an integer that is equal to or greater than 2) first optical resonators. Each of the i photodetector groups includes j photodetectors. Each of the i second optical resonator groups includes j second optical resonators. Each of the i signal processing circuit groups includes j signal processing circuits. Each of the j first optical resonators is formed of silicon to which stress is applied. When any one of a voltage, a magnetic field, and heat is applied, each of the j first optical resonators guides to the optical transmission member a light component having a resonance wavelength among the light components traveling through the optical waveguide. Each of the j second optical resonators is formed of silicon to which stress is applied. When any one of a voltage, a magnetic field, and heat is applied, each of the j second optical resonators guides to the photodetector a light component having a resonance wavelength among the light components traveling through the optical transmission member. Each of the j photodetectors detects light guided by the second optical resonator. Each of the j signal processing circuits transmits signals by applying any one of a voltage, a magnetic field, and heat to the first optical resonator and by applying none of them thereto, and processes the signal detected by the photodetector by applying any one of the voltage, the magnetic field, and the heat to the second optical resonator and by applying none of them thereto.

In the above-mentioned aspects, the optical transmission member is used as a common optical transmission path to transmit or receive signals.

Therefore, according to the above-mentioned aspects, two arbitrary optical transceivers can directly communicate with each other.

In the above-mentioned aspects, a plurality of optical transceivers use light components having different wavelength to transmit or receive signals.

Therefore, according to the above-mentioned aspects, it is possible to perform communication between two arbitrary optical transceivers at the same time.

BRIEF DESCRIPTION OF THE DRAWINGS

FIG. 3 is a perspective view illustrating the structure of the optical transceiver shown in FIG. 2.

FIG. 4 is a plan view illustrating two optical resonators shown in FIG. 3.

FIG. 5 is a cross-sectional view illustrating the optical resonator.

FIG. 23 is a cross-sectional view illustrating the optical integrated circuit apparatus taken along the line XXIII-XXIII of FIG. 21.

DESCRIPTION OF REPRESENTATIVE EMBODIMENTS

Figure 1:
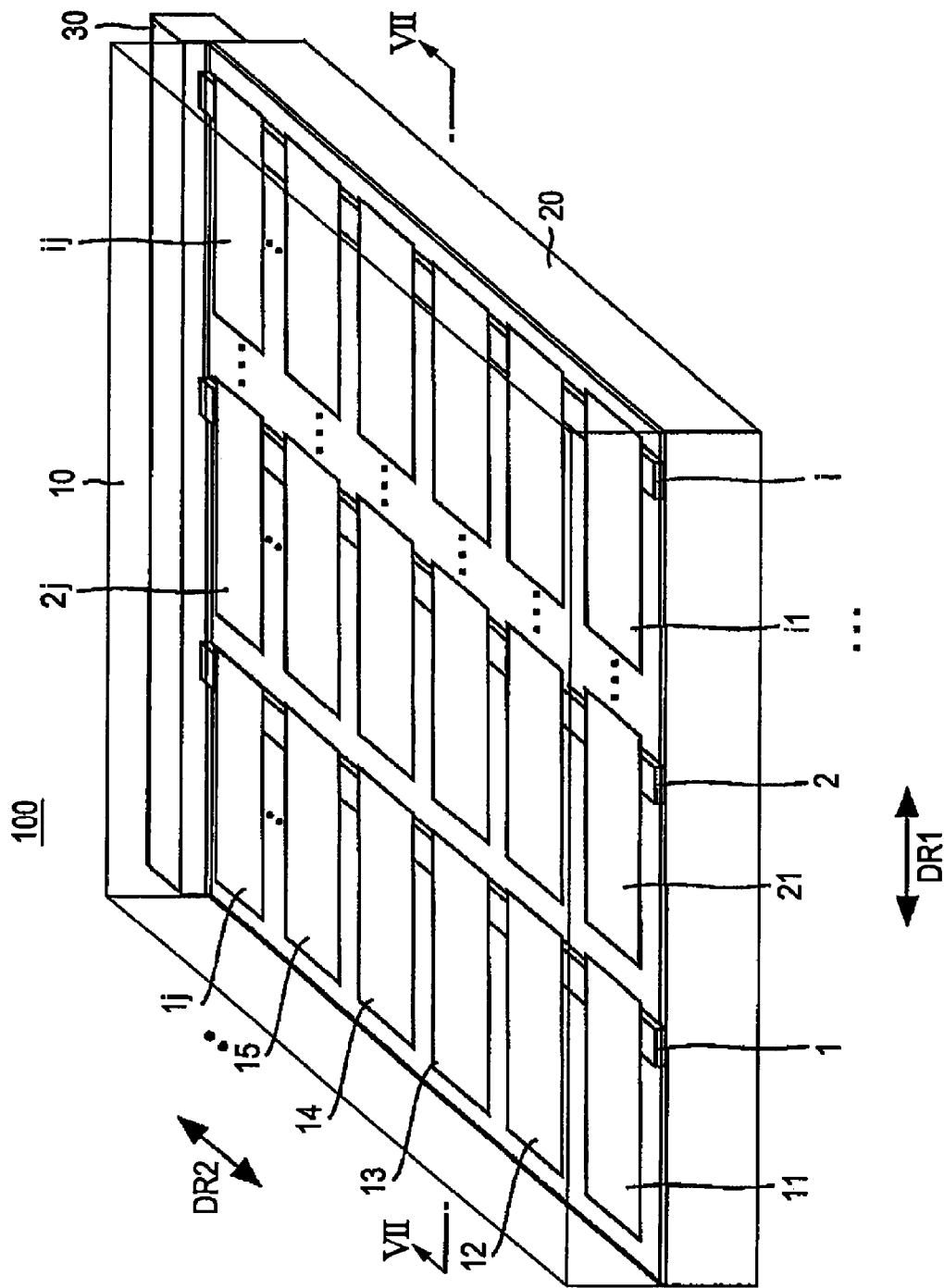
FIG. 1 is a perspective view illustrating an optical integrated circuit apparatus according to a representative embodiment.

Hereinafter, representative embodiments are described in detail with reference to the accompanying drawings. In the drawings, the same or similar components are denoted by the same reference numerals, and a detailed description thereof will be omitted.

FIG. 1 is a perspective view illustrating an optical integrated circuit apparatus according to a representative embodiment. Referring to FIG. 1, an optical integrated circuit apparatus 100 includes an optical transmission member 10, a semiconductor substrate 20, a light source 30, optical waveguides 1 to i (i is a positive integer), and optical transceivers 11 to 1j, 21 to 2j, ..., i1 to ij (j is an integer that is greater than or equal to 2). In addition, the optical integrated circuit apparatus 100 has a size of 1 cm×1 cm to 2 cm×2 cm.

The optical transmission member 10 is a flat plate, and is formed of a transparent material having a refractive index that is larger than that of air, such as silicon nitride (SiN), silicon dioxide ($SiO_2$), silicon oxynitride (SiON), resist, or plastic.

The semiconductor substrate 20 is formed of, for example, n-type silicon (n-type Si), and is arranged in the vicinity of one surface of the optical transmission member 10. The light source 30 is arranged on one side surface of the semiconductor substrate 20.

Each of the optical waveguides 1 to i is made of the same material as that forming the optical transmission member 10, and has the same length as the semiconductor substrate 20 in a direction DR2 and a width of 0.3 mm to 5 mm. Therefore, the optical waveguides 1 to i are arranged on one main surface of the semiconductor substrate 20 at predetermined intervals in a direction DR1.

The optical transceivers 11 to 1j, 21 to 2j, ..., i1 to ij are two-dimensionally arranged on the semiconductor substrate 20. Specifically, the optical transceivers 11 to 1j are provided to correspond to the optical waveguide 1, and are arranged at predetermined intervals in the direction DR2. The optical transceivers 21 to 2j are provided to correspond to the optical waveguide 2 and are arranged at predetermined intervals in the direction DR2. Similarly, the optical transceivers i1 to ij are provided to correspond to the optical waveguide i and are arranged at predetermined intervals in the direction DR2.

The optical transmission member 10 transmits light that is incident from the optical transceivers 11 to 1j, 21 to 2j, ..., i1 to ij. The optical waveguides 1 to i transmit light emitted from the light source 30 in the direction DR2. Each of the optical transceivers 11 to 1j and 21 to 2j, ..., i1 to ij guides a portion of the light traveling through the optical waveguides 1 to i to the optical transmission member 10, and detects light traveling through the optical transmission member 10 by the following method. The light source 30 generates light components Lg1 to Lgm having discrete wavelengths of $\lambda 1, \lambda 2, ..., \lambda m$ (m is a positive integer) or a continuous light component Lgc in a predetermined wavelength range, and emits the light components Lg1 to Lgm or the light component Lgc to the optical waveguides 1 to i.

Figure 2:
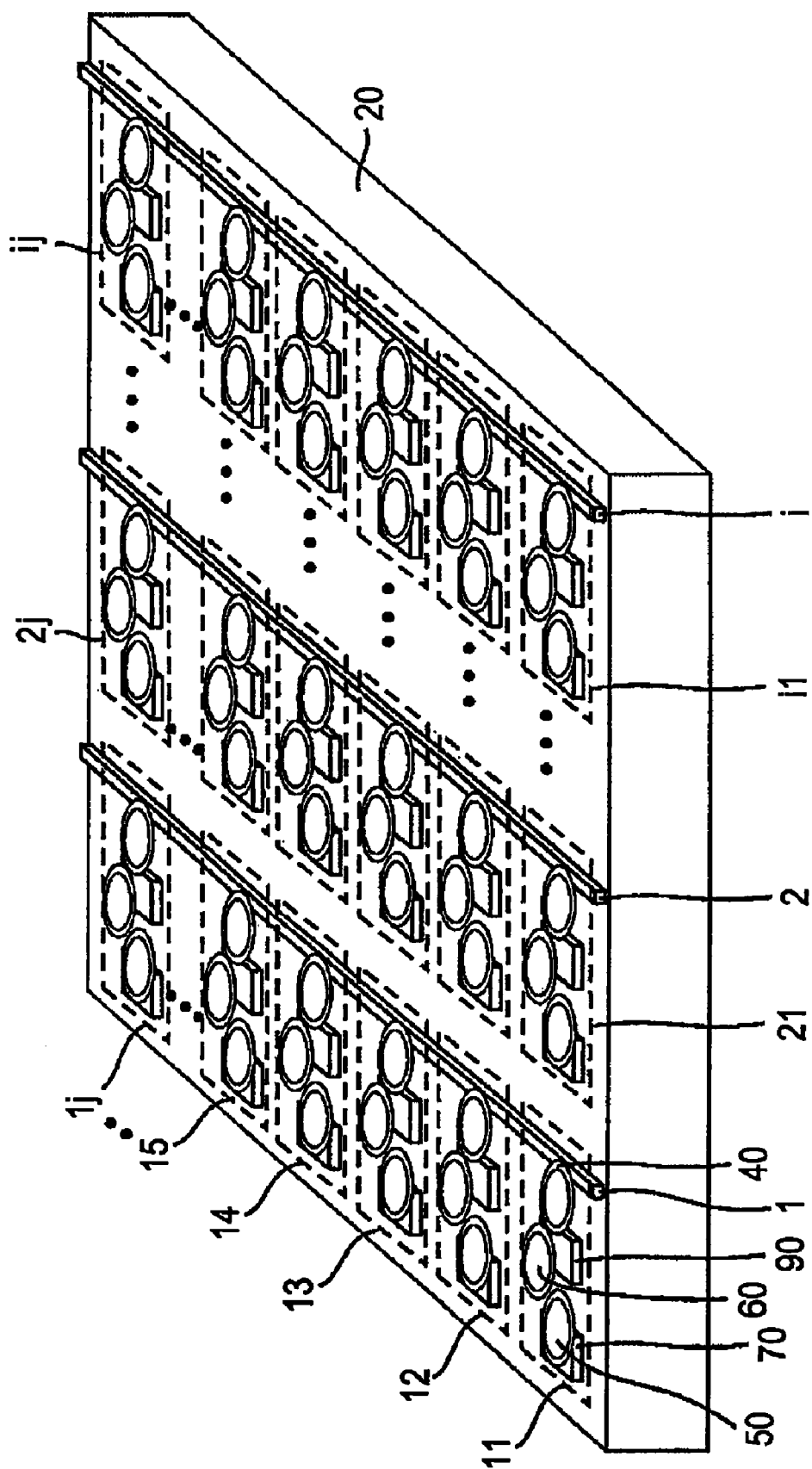
FIG. 2 is a perspective view illustrating a semiconductor substrate, optical waveguides, and optical transceivers shown in FIG. 1.

FIG. 2 is a perspective view illustrating the semiconductor substrate 20, the optical waveguides 1 to i, and the optical transceivers 11 to 1j, 21 to 2j, ..., i1 to ij shown in FIG. 1. Referring to FIG. 2, the optical transceiver 11 includes optical resonators 40, 50, and 60, a photodetector 70, and a signal processing circuit 90.

Each of the optical resonators 40, 50, and 60 is formed of Si to which stress is applied and has a ring shape. Each of the optical resonators 40, 50, and 60 has a diameter of 10 μm and a width of 0.4 μm.

The optical resonator 40 is arranged on the optical waveguide 1 corresponding to the optical transceiver 11. The optical resonators 50 and 60 are arranged so as to be spaced from the optical resonator 40. The photodetector 70 is composed of, for example, a photodiode, and is arranged below the optical resonator 50. Although not shown in FIG. 2, a photodetector is also arranged below the optical resonator 60.

The signal processing circuit 90 is provided between the optical waveguide 1 corresponding to the optical transceiver 11 and the photodetector 70.

Each of the optical transceivers 12 to 1j, 21 to 2j, ..., i1 to ij has the same structure as the optical transceiver 11.

FIG. 3 is a perspective view illustrating the structure of the optical transceiver 11 shown in FIG. 2. Referring to FIG. 3, the optical transceiver 11 includes a photodetector 80, in addition to the optical resonators 40, 50, and 60, the photodetector 70, and the signal processing circuit 90.

The photodetector 80 is composed of a photodiode, and is arranged below the optical resonator 60. The optical resonator 40 includes a light emission window 41. The light emission window 41 is formed in a ring shape, and has the same diameter and width as those of the optical resonator 40. The light emission window 41 is arranged on the optical resonator 40 so as to contact the optical resonator 40.

The optical resonator 50 includes a light incident window 51, and the optical resonator 60 includes a light incident window 61. The light incident windows 51 and 61 have substantially rectangular shapes, and are arranged on the optical resonators 50 and 60 so as to contact the optical resonators 50 and 60, respectively.

Each of the optical transceivers 12 to 1j, 21 to 2j, ..., i1 to ij has the same structure as the optical transceiver 11 shown in FIG. 3.

FIG. 4 is a plan view illustrating two optical resonators 50 and 60 shown in FIG. 3. Referring to FIG. 4, the optical resonators 50 and 60 are arranged such that the light incident window 51 provided in the optical resonator 50 is arranged at an angle of 90 degrees with respect to the light incident window 61 provided in the optical resonator 60.

As a result, a light component 1 is incident on the optical resonator 60 through the light incident window 61, and travels through the optical resonator 60 in the direction of an arrow ARW2. A light component 2 is incident on the optical resonator 50 through the light incident window 51, and travels through the optical resonator 50 in the direction of an arrow ARW1. A light component 3 is incident on the optical resonators 50 and 60 through the light incident windows 51 and 61 and travels through the optical resonators 50 and 60 in the directions of the arrows ARW1 and ARW2, respectively.

As described above, since the light incident window 51 provided in the optical resonator 50 is arranged at an angle of 90 degrees with respect to the light incident window 61 provided in the optical resonator 60, it is possible to make light traveling through the optical transmission member 10 in all directions incident on the optical resonator 50 and/or the optical resonator 60.

FIG. 5 is a cross-sectional view illustrating the optical resonator 40. Referring to FIG. 5, the optical resonator 40 includes a silicon layer 401 and stress applying layers 402 and 403.

The silicon layer 401 has a ring shape. The stress applying layer 402 is formed on the silicon layer 401 so as to contact the silicon layer 401. The stress applying layer 403 is formed below the silicon layer 401 so as to contact the silicon layer 401. The stress applying layer 402 is formed of $Si_3N_4$, and the stress applying layer 403 is formed of $SiO_2$.

Each of the optical resonators 50 and 60 has the same cross-sectional structure as the optical resonator 40 shown in FIG. 5.

Figure 6:
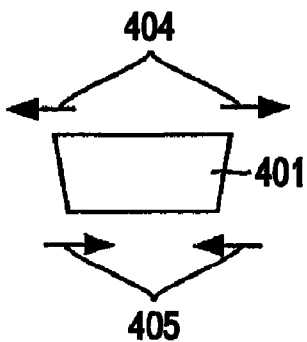
FIG. 6 is a cross-sectional view illustrating the application of stress to a silicon layer shown in FIG. 5.

FIG. 6 is a cross-sectional view illustrating the application of stress to the silicon layer 401 shown in FIG. 5. Referring to FIG. 6, the stress applying layer 402 made of $Si_3N_4$ applies a tensile stress of 1.855 GPa to the silicon layer 401, and the stress applying layer 403 made of $SiO_2$ applies a compression stress of 0.066 GPa to the silicon layer 401.

Therefore, the silicon layer 401 is extended in the direction of an arrow 404 by the stress applying layer 402 and is compressed in the direction of an arrow 405 by the stress applying layer 403. As a result, the silicon layer 401 is deformed in a substantially trapezoidal shape. The silicon layer 401 serves as an electro-optical material when a voltage is applied to the silicon layer 401 while receiving stress from the stress applying layers 402 and 403.

In the optical resonators 40, 50, and 60, the stress applying layer 402 may be formed below the silicon layer 401 so as to contact the silicon layer 401, and the stress applying layer 403 may be formed on the silicon layer 401 so as to contact the silicon layer 401.

Figure 7:
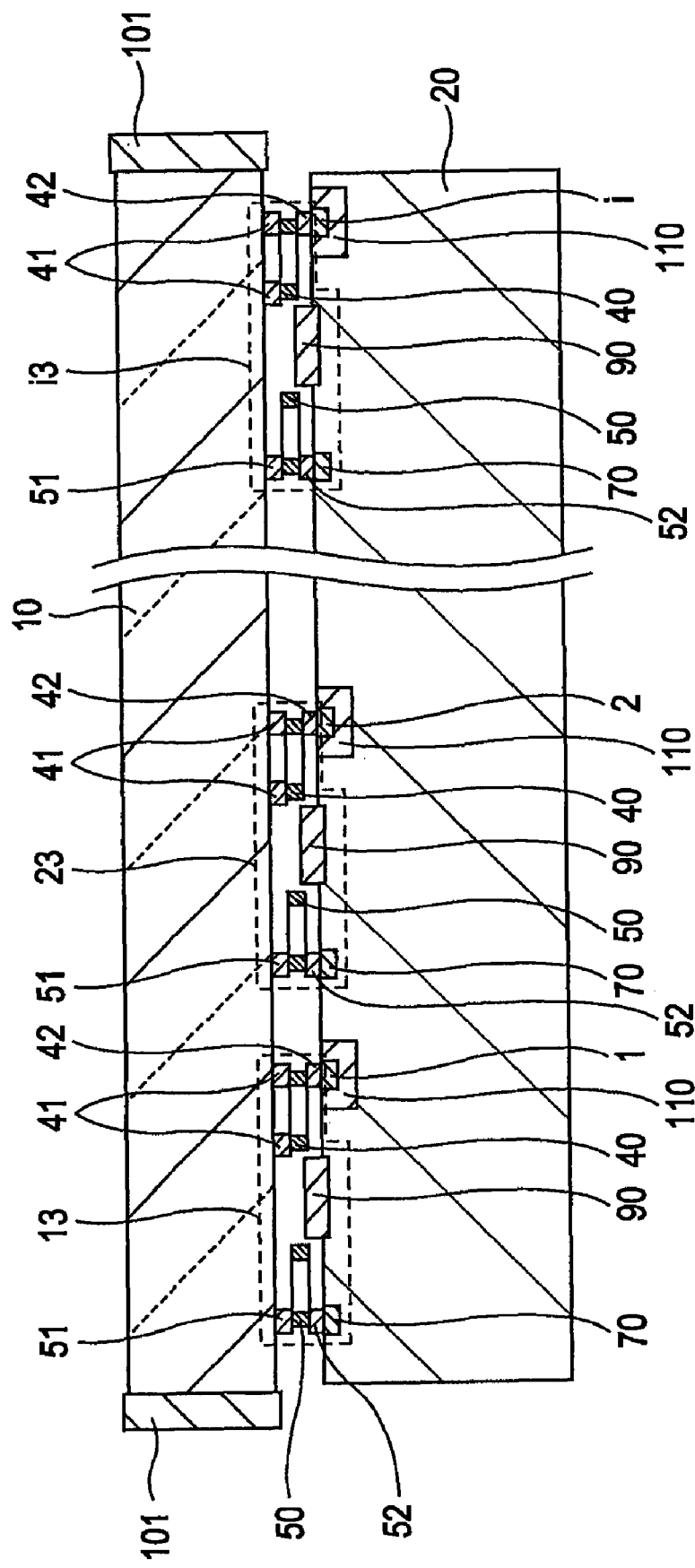
FIG. 7 is a cross-sectional view illustrating the optical integrated circuit apparatus taken along the line VII-VII of FIG. 1.

FIG. 7 is a cross-sectional view illustrating the optical integrated circuit apparatus 100 taken along the line VII-VII of FIG. 1. Referring to FIG. 7, the optical transmission member 10 has a light absorbing member 101 formed therearound. The light absorbing member 101 absorbs light that travels through the optical transmission member 10. In this way, it is possible to prevent light from being reflected from the optical transmission member 10. As a result, it is possible to prevent the interference of light in the optical transmission member 10 and accurately perform optical communication.

The optical waveguides 1 to i are formed on one main surface of the semiconductor substrate 20. In this case, each of the optical waveguides 1 to i is buried in the one main surface of the semiconductor substrate 20 such that it is surrounded by a silicon oxide film 110 and one surface thereof is flush with the one main surface of the semiconductor substrate 20. The silicon oxide film 110 has a thickness of 1.5 μm.

As described above, since the optical waveguides 1 to i are surrounded by the silicon oxide film 110, it is possible to reduce the loss of light traveling through the optical waveguides 1 to i.

Each of the optical transceivers 11 to 1j, 21 to 2j, . . . , i1 to ij further includes optical coupling windows 42 and 52.

The optical coupling windows 42 included in the optical transceivers 11 to 1j, 21 to 2j, . . . , i1 to ij are formed on the optical waveguides 1 to i respectively corresponding to the optical transceivers 11 to 1j, 21 to 2j, . . . , i1 to ij so as to contact the optical waveguides 1 to i.

The optical resonator 40 included in each of the optical transceivers 11 to 1j, 21 to 2j, . . . , i1 to ij is formed between the light emission window 41 and the optical coupling window 42 included in each of the optical transceivers 11 to 1j, 21 to 2j, . . . , i1 to ij so as to contact the light emission window 41 and the optical coupling window 42.

The light emission window 41 included in each of the optical transceivers 11 to 1j, 21 to 2j, . . . , i1 to ij is formed between the optical transmission member 10 and the optical resonator 40 so as to contact the optical transmission member 10 and the optical resonator 40. The light emission window 41 is made of a material having a refractive index that is smaller than those of the optical transmission member 10 and the optical resonators 40, 50, and 60 and is larger than the surrounding refractive index.

The light incident window 51 included in each of the optical transceivers 11 to 1j, 21 to 2j, . . . , i1 to ij is formed between the optical transmission member 10 and the optical resonator 50 so as to contact the optical transmission member 10 and the optical resonator 50. The light incident window 51 is made of a material having a refractive index that is smaller than those of the optical transmission member 10 and the optical resonator 40, 50, and 60 and is larger than the surrounding refractive index.

The optical resonator 50 included in each of the optical transceivers 11 to 1j, 21 to 2j, . . . , i1 to ij is formed between the light incident window 51 and the optical coupling window 52 included in each of the optical transceivers 11 to 1j, 21 to 2j, . . . , i1 to ij so as to contact the light incident window 51 and the optical coupling window 52.

The optical coupling window 52 included in each of the optical transceivers 11 to 1j, 21 to 2j, . . . , i1 to ij is formed between the optical resonator 50 and the photodetector 70 included in each of the optical transceivers 11 to 1j, 21 to 2j, . . . , i1 to ij so as to contact the optical resonator 50 and the photodetector 70.

Each of the optical transceivers 11 to 1j, 21 to 2j, . . . , i1 to ij further includes an optical coupling window 62. The optical resonator 60, the light incident window 61, the optical coupling window 62, and the photodetector 80 are arranged, similar to the optical resonator 50, the light incident window 51, the optical coupling window 52, and the photodetector 70 as shown in FIG. 7.

The photodetector 70 included in each of the optical transceivers 11 to 1j, 21 to 2j, . . . , i1 to ij is buried in the semiconductor substrate 20 so as to be flush with the one main surface of the semiconductor substrate 20, similar to the optical waveguides 1 to i.

The signal processing circuits 90 included in the optical transceivers 11 to 1j, 21 to 2j, . . . , i1 to ij are formed on the one main surface of the semiconductor substrate 20 between the optical waveguides 1 to i corresponding to the optical transceivers 11 to 1j, 21 to 2j, . . . , i1 to ij and the photodetectors 70.

The semiconductor substrate 20 is arranged adjacent to the optical transmission member 10 such that the gap between the optical transmission member 10, and the light emission window 41 and the light incident windows 51 and 61 included in each of the optical transceivers 11 to 1j, 21 to 2j, . . . , i1 to ij is 0.2 μm.

When the diameter of the optical resonators 40, 50, and 60 is r, the refractive index of the optical resonators 40, 50, and 60 is n, and a resonance wavelength is $\lambda_0$, the following equation is established:

$$2\pi r = s\lambda_0/n \quad (s \text{ is a positive integer})\qquad\text{[Equation 1]}$$

When a voltage is applied to the optical resonators 40, 50, and 60, the refractive indexes of the optical resonators 40, 50, and 60 vary. Therefore, when a voltage is applied to the optical resonators 40, 50, and 60 so as to have the refractive indexes satisfying Equation 1, light having the wavelength $\lambda_0$ travels through the optical resonators 40, 50, and 60 as resonance light, and a portion of the light is emitted to the optical transmission member 10 or the photodetectors 70 and 80.

Specifically, when a voltage is applied to the optical resonator 40 so as to have a refractive index satisfying Equation 1, light having the wavelength $\lambda_0$ travels through the optical resonator 40 through the optical coupling window 42 as resonance light, and a portion of the light is emitted to the optical transmission member 10 through the light emission window 41. When a voltage is applied to the optical resonators 50 and 60 so as to have the refractive indexes satisfying Equation 1, light having the wavelength $\lambda_0$ travels through the optical resonators 50 and 60 through the light incident windows 51 and 61 as resonance light, and a portion of the light is emitted to the photodetectors 70 and 80 through the light coupling windows 52 and 62, respectively.

Light components Lg1 to Lgm having discrete wavelengths $\lambda 1$ to $\lambda m$ or a light component having a continuous wavelength in the range of $\lambda 1$ to $\lambda m$ travels through the optical waveguides 1 to i. Therefore, a voltage Vk applied to the optical transmission members 40, 50, and 60 is determined such that one wavelength $\lambda k$ (k=1 to m) among the wavelengths $\lambda 1$ to $\lambda m$ becomes the resonance wavelength $\lambda_0$.

Figure 8:
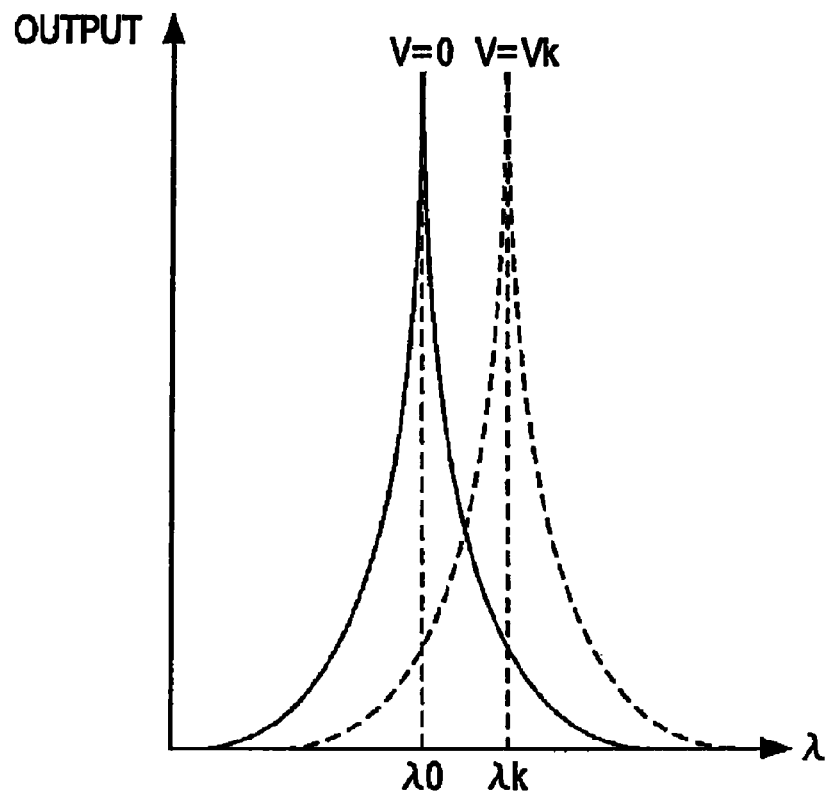
FIG. 8 is a diagram illustrating the relationship between a wavelength and the output of the optical resonator.
Figure 9:
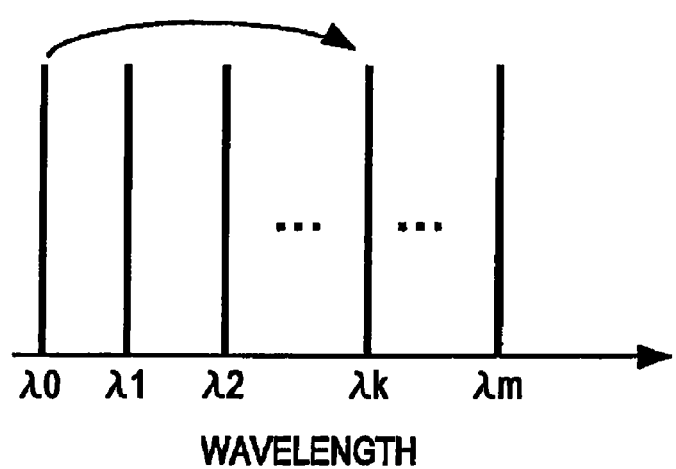
FIG. 9 is a conceptual diagram illustrating the selection of a resonance wavelength.

FIG. 8 is a diagram illustrating the relationship between the outputs of the optical resonator 40, 50, and 60 and wavelengths. FIG. 9 is a conceptual diagram illustrating the selection of a resonance wavelength. Referring to FIG. 8, when no voltage is applied to the optical resonators 40, 50, and 60 (V=0), the optical resonators 40, 50, and 60 output light having the wavelength $\lambda_0$ as a peak wavelength. On the other hand, when the voltage Vk is applied to the optical resonators 40, 50, and 60, the optical resonators 40, 50, and 60 resonate with light having the wavelength $\lambda k$ and output light having the wavelength $\lambda k$ as a peak wavelength.

Therefore, when no voltage is applied, the optical resonator 40 does not resonate with the light components Lg1 to Lgm having the discrete wavelengths $\lambda 1$ to $\lambda m$ or a light component having a continuous wavelength in the range of $\lambda 1$ to $\lambda m$ traveling through the optical waveguides 1 to i. As a result, the optical resonator 40 does not emit light to the optical transmission member 10.

On the other hand, when the voltage Vk is applied, the optical resonator 40 resonates with a light component Lgk having the wavelength $\lambda k$ among the light components Lg1 to Lgm having the discrete wavelengths $\lambda 1$ to $\lambda m$ or a light component having a continuous wavelength in the range of $\lambda 1$ to $\lambda m$ traveling through the optical waveguides 1 to i. As a result, the optical resonator 40 emits the light component Lgk to the optical transmission member 10.

When no voltage is applied, the optical resonators 50 and 60 do not resonate with the light component Lgk traveling through the optical transmission member 10. As a result, the optical resonators 50 and 60 do not emit light to the photodetectors 70 and 80.

On the other hand, when the voltage Vk is applied, the optical resonators 50 and 60 resonate with the light component Lgk traveling through the optical transmission member 10. As a result, the optical resonators 50 and 60 emit the light component Lgk to the photodetectors 70 and 80, respectively.

As described above, when the voltage Vk is applied, the optical resonator 40 emits, to the optical transmission member 10, the light component Lgk having the wavelength $\lambda k$ among the light components Lg1 to Lgm having the discrete wavelengths $\lambda 1$ to $\lambda m$ or a light component having a continuous wavelength in the range of $\lambda 1$ to $\lambda m$ traveling through the optical waveguides 1 to i. When no voltage is applied, the optical resonator 40 does not emit light to the optical transmission member 10.

When the voltage Vk is applied, the optical resonators 50 and 60 emit the light component Lgk traveling through the optical transmission member 10 to the photodetectors 70 and 80, respectively. When no voltage is applied, the optical resonators 50 and 60 do not emit light to the photodetectors 70 and 80.

The photodetector 70 detects the intensity of light emitted from the optical resonator 50, and outputs the detected intensity to the signal processing circuit 90.

The photodetector 80 detects the intensity of light emitted from the optical resonator 60, and outputs the detected intensity to the signal processing circuit 90.

When the signal processing circuit 90 transmits signals to another optical transceiver, it repeatedly performs an operation that applies the voltage Vk to the silicon layer 401 of the optical resonator 40 and an operation that does not apply the voltage Vk to the silicon layer 401 of the optical resonator 40. Specifically, the signal processing circuit 90 applies the voltage Vk to the silicon layer 401 of the optical resonator 40 in correspondence with a digital signal of "1", and stops the application of the voltage Vk to the silicon layer 401 of the optical resonator 40 in correspondence with a digital signal of "0".

When the signal processing circuit 90 receives signals from another optical transceiver, it applies the voltage Vk to the silicon layers 401 of the optical resonators 50 and 60.

The signal processing circuit 90 demodulates and processes signals on the basis of the light intensities received from the photodetectors 70 and 80. Specifically, the signal processing circuit 90 calculates the sum of two light intensities received from the photodetectors 70 and 80, and demodulates and processes the signals on the basis of the calculated sum.

Figure 10:
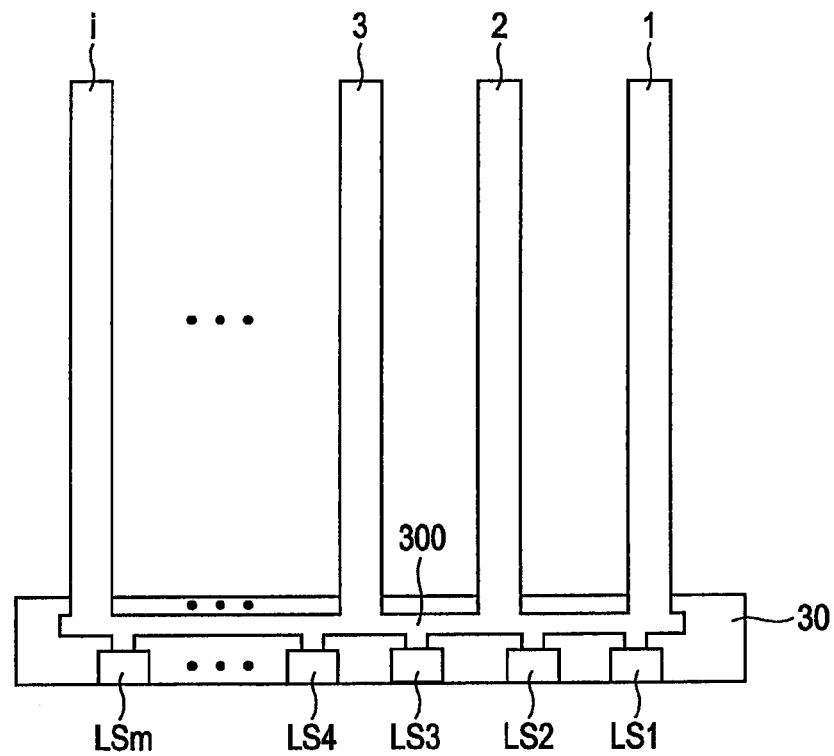
FIG. 10 is a diagram illustrating an example of the structure of a light source shown in FIG. 1.

FIG. 10 is a diagram illustrating an example of the structure of the light source 30 shown in FIG. 1. Referring to FIG. 10, the light source 30 includes lasers LS1 to LSm and a waveguide 300. The waveguide 300 is connected to the lasers LS1 to LSm and the optical waveguides 1 to i.

The lasers LS1 to LSm generate the light components Lg1 to Lgm having the wavelengths $\lambda 1$ to $\lambda m$, respectively, and emit the generated light components Lg1 to Lgm to the waveguide 300. The waveguide 300 transmits the light components Lg1 to Lgm received from the lasers LS1 to LSm to guide to the optical waveguides 1 to i.

As described above, the light source 30 generates the light components Lg1 to Lgm having the wavelengths $\lambda 1$ to $\lambda m$, and guides the generated light components Lg1 to Lgm to the optical waveguides 1 to i.

Figure 11:
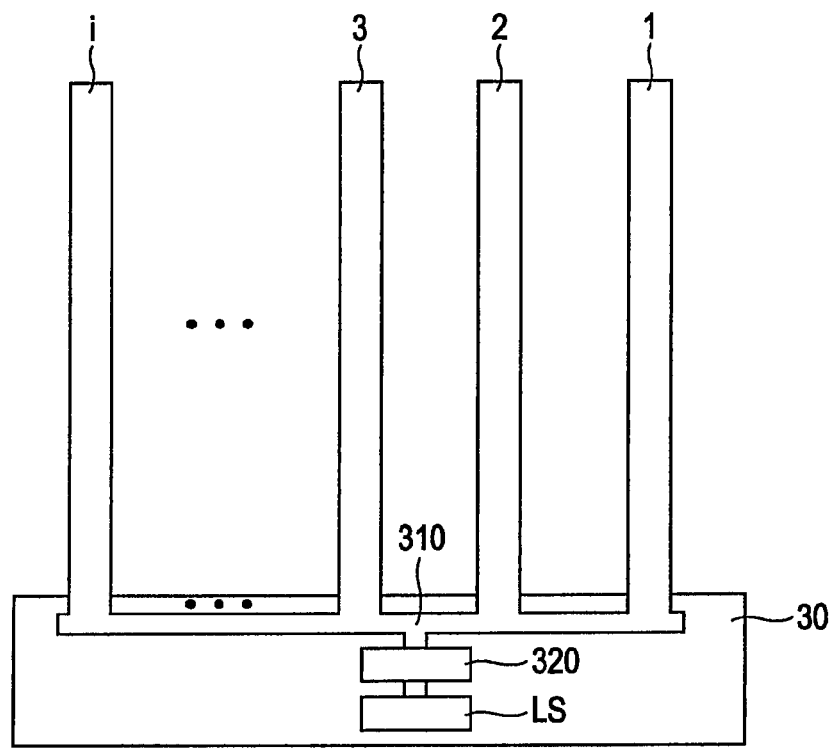
FIG. 11 is a diagram illustrating another example of the structure of the light source shown in FIG. 1.

FIG. 11 is a diagram illustrating another example of the structure of the light source 30 shown in FIG. 1. Referring to FIG. 11, the light source 30 includes a light-emitting element LS, a waveguide 310, and a filter 320. The waveguide 310 is connected to the optical waveguides 1 to i and the filter 320. The filter 320 is connected to the light-emitting element LS and the waveguide 310.

The light-emitting element LS is composed of, for example, an ultraviolet excitation fluorescence element, and emits light having a continuous wavelength. The filter 320 transmits only light components in a predetermined wavelength range among the light components having a continuous wavelength emitted from the light-emitting element LS to the waveguide 310. The waveguide 310 guides the light components having a continuous wavelength received from the filter 320 to the optical waveguides 1 to i.

In this embodiment, it is preferable that the light source 30 have one of the structure shown in FIG. 10 and the structure shown in FIG. 11.

FIGS. 12 to 16 are first to fifth process diagrams illustrating a method of manufacturing the optical integrated circuit apparatus 100 shown in FIG. 1. When the method of manufacturing the optical integrated circuit apparatus 100 starts, a resist is applied onto one main surface of the semiconductor substrate 20 made of n-type Si, and the applied resist is patterned by photolithography to form a resist pattern 120 on the one main surface of the semiconductor substrate 20 (see a process (a) of FIG. 12).

Figure 12:
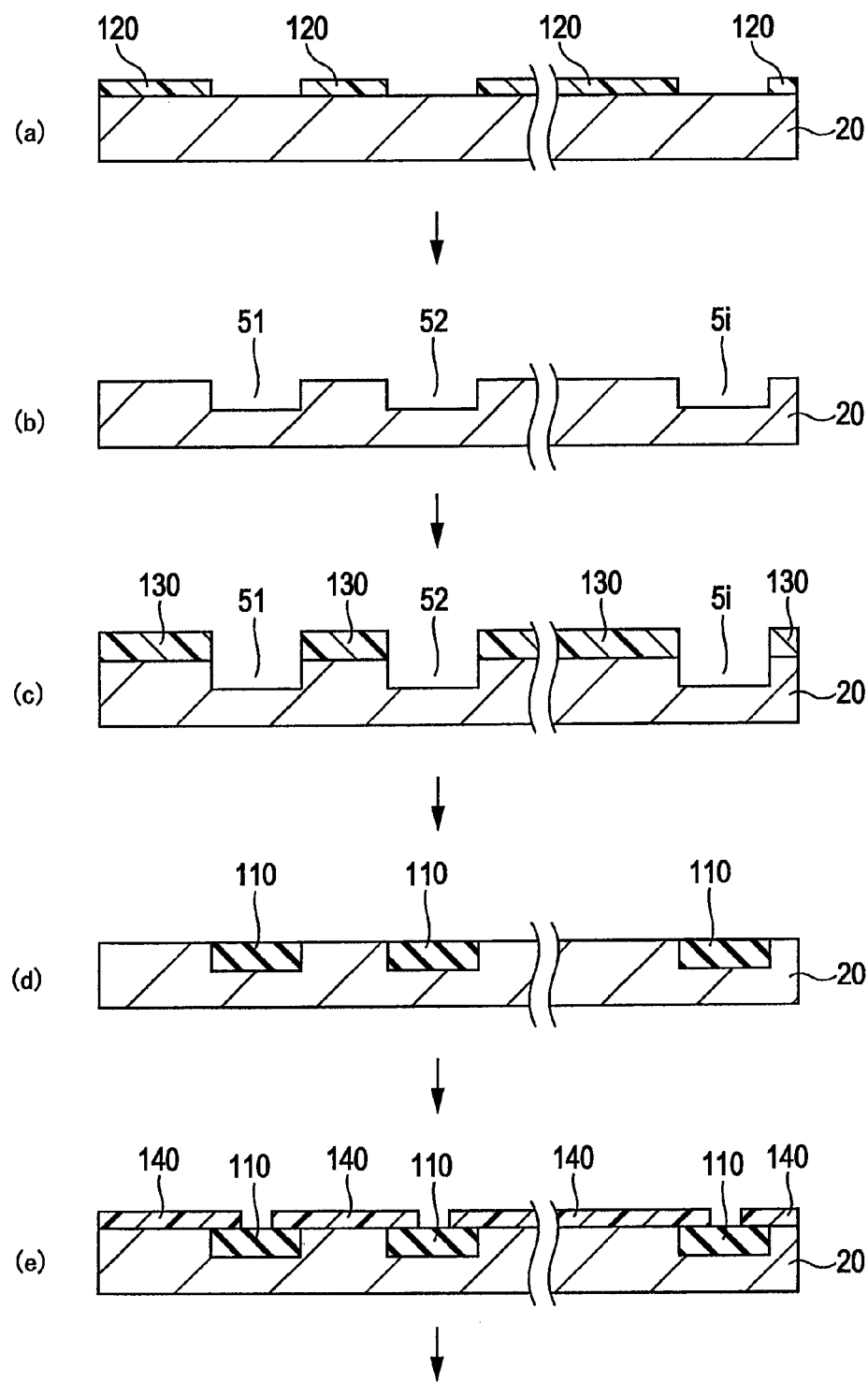
FIG. 12 is a first process diagram illustrating a method of manufacturing the optical integrated circuit apparatus shown in FIG. 1.

Then, reactive ion etching is performed on the one main surface of the semiconductor substrate 20 using the resist pattern 120 as a mask to form grooves 51 to 5i in the one main surface of the semiconductor substrate 20 (see a process (b) of FIG. 12). In the case, each of the grooves 51 to 5i has a depth of about 1.5 μm.

Then, a resist is applied so as to cover the entire surface of the semiconductor substrate 20, and the applied resist is patterned by photolithography to form a resist pattern 130 in a region other than the grooves 51 to 5i (see a process (c) of FIG. 12).

Then, a silicon oxide film is formed on the one main surface of the semiconductor substrate 20 so as to cover the grooves 51 to 5i and the resist pattern 130 by a plasma CVD (chemical vapor deposition) method, and the resist pattern 130 is removed. In this way, a silicon oxide film 110 is formed on the one main surface of the semiconductor substrate 20 (see a process (d) of FIG. 12). In this case, silane ($SiH_4$) gas and $N_2O$ gas are used as raw material gases for forming the silicon oxide film 110.

Then, a resist is applied so as to cover the entire surface of the semiconductor substrate 20, and the applied resist is patterned by photolithography to form a resist pattern 140 such that portions of the silicon oxide film 110 are opened (see a process (e) of FIG. 12).

Figure 13:
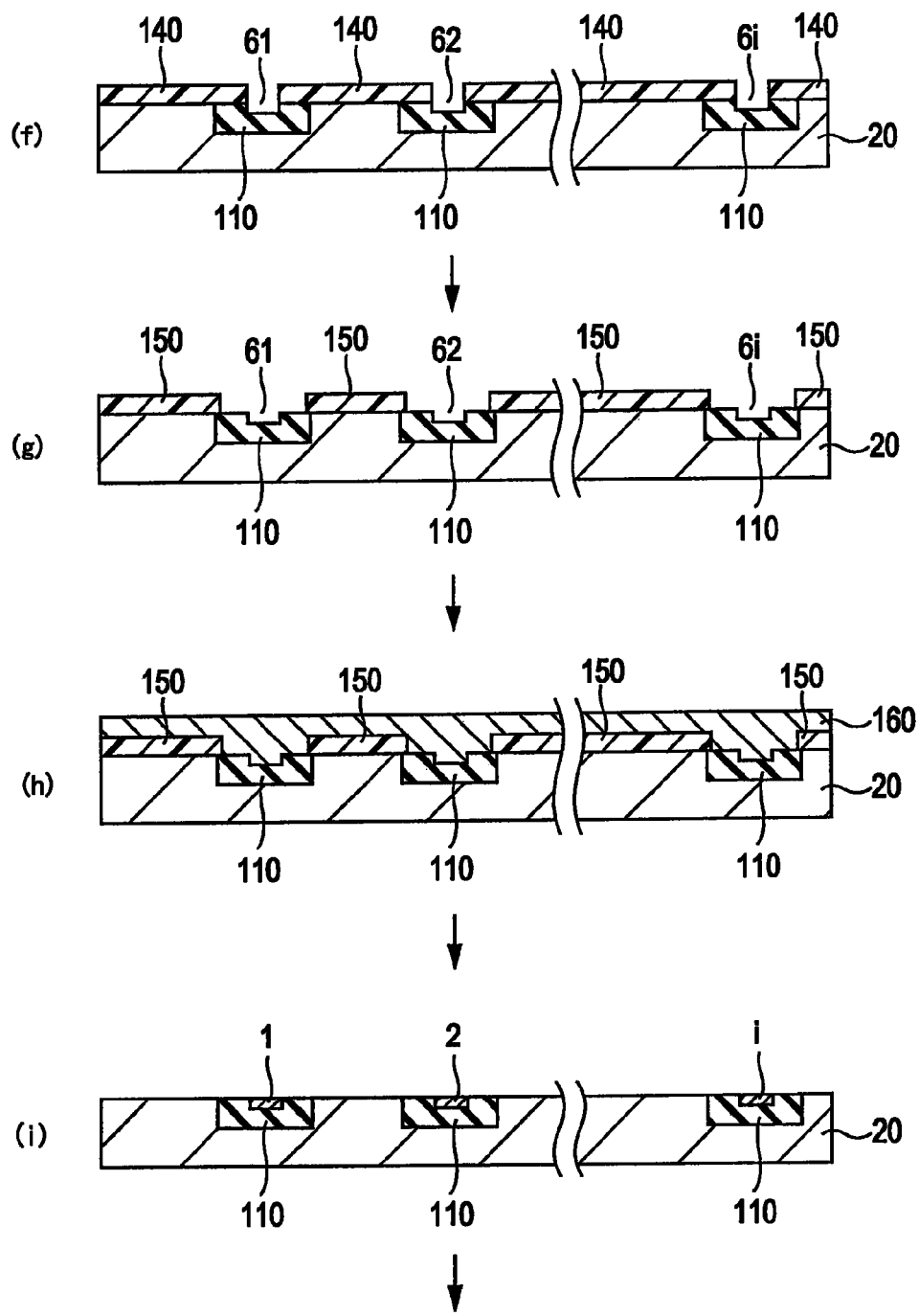
FIG. 13 is a second process diagram illustrating the method of manufacturing the optical integrated circuit apparatus shown in FIG. 1.

Then, reactive ion etching is performed on the silicon oxide film 110 using the resist pattern 140 as a mask to form grooves 61 to 6i in the silicon oxide film 110 (see a process (f) of FIG. 13), and the resist pattern 140 is removed.

Then, a resist is applied so as to cover the grooves 61 to 6i and the surface of the semiconductor substrate 20, and the applied resist is patterned by photolithography to form a resist pattern 150 such that portions of the silicon oxide film 110 are opened (see a process (g) of FIG. 13).

Subsequently, a silicon nitride film (SiN) 160 is formed on the one main surface of the semiconductor substrate 20 by a sputtering method so as to cover the grooves 61 to 6i and the resist pattern 150 (see a process (h) of FIG. 13).

Then, the SiN film 160 is etched until the surface of the silicon oxide film 110 is exposed, and the resist pattern 150 is removed. In this way, the optical waveguides 1 to i surrounded by the silicon oxide film 110 are formed on the one main surface of the semiconductor substrate 20 (see a process (i) of FIG. 13).

Figure 14:
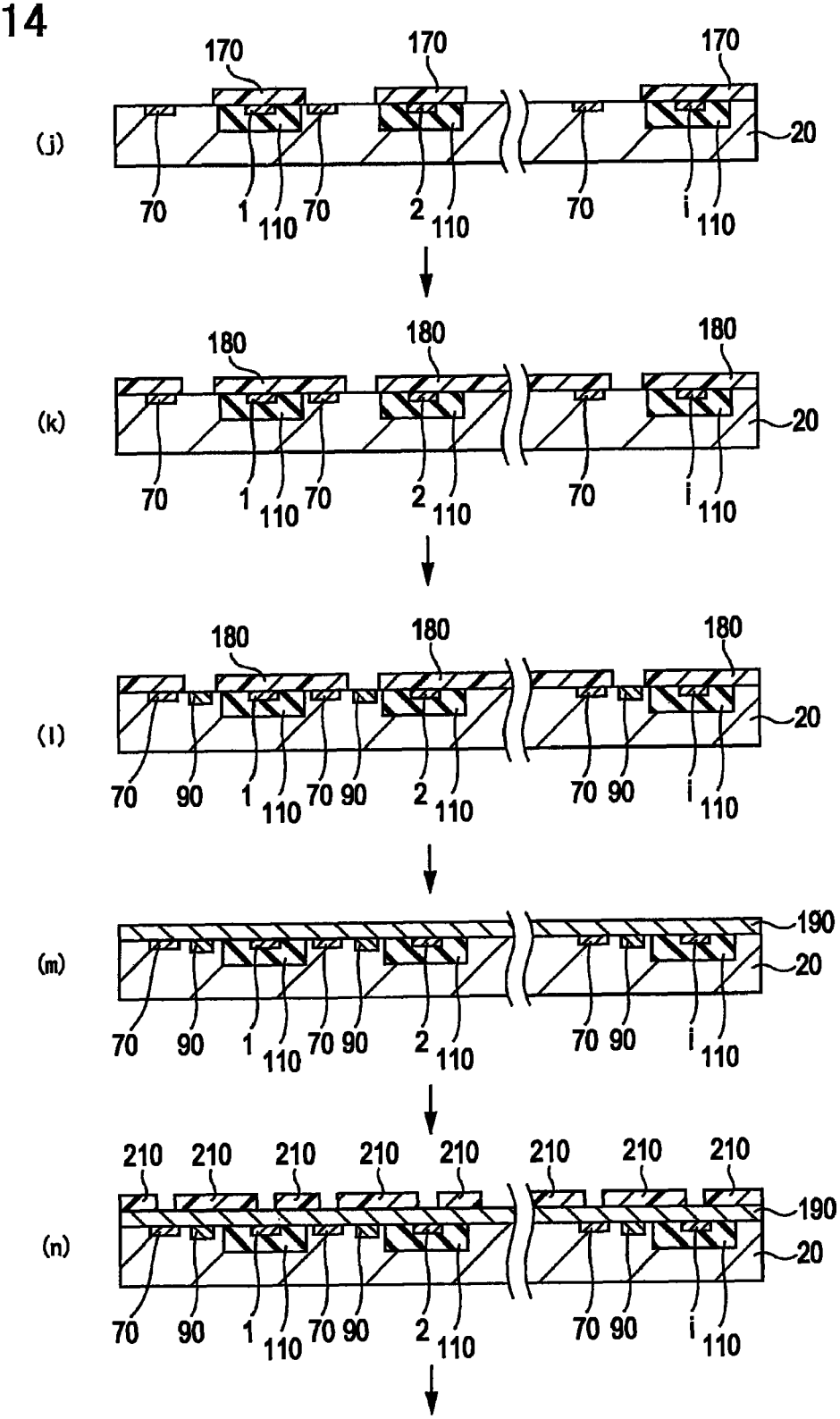
FIG. 14 is a third process diagram illustrating the method of manufacturing the optical integrated circuit apparatus shown in FIG. 1.

Subsequently, a resist is applied onto the entire surface of the semiconductor substrate 20 so as to cover the optical waveguides 1 to i, and the applied resist is patterned by photolithography to form a resist pattern 170 on the silicon oxide film 110. Then, boron ions (B+) are implanted into some regions of the semiconductor substrate 20 using the resist pattern 170 as a mask to form a p-n junction. In this way, the photodetectors 70 and 80 included in each of the optical transceivers 11 to 1j, 21 to 2j, . . . , i1 to ij are formed on the one main surface of the semiconductor substrate 20 (see a process (j) of FIG. 14). FIG. 14 shows only the photodetector 70. However, actually, the photodetector 80 is formed in a region in the depth direction of the plane of FIG. 14.

Then, a resist is applied onto the entire surface of the semiconductor substrate 20, and the applied resist is patterned by photolithography to form a resist pattern 180 (see a process (k) of FIG. 14).

Then, the signal processing circuits 90 included in the optical transceivers 11 to 1j, 21 to 2j, . . . , i1 to ij are formed between the optical waveguides 1 to i and the photodetectors 70 using the resist pattern 180 as a mask (see a process (l) of FIG. 14).

Then, a SiN film 190 is formed on the entire surface of the semiconductor substrate 20 by a sputtering method so as to cover the photodetectors 70 and 80, the signal processing circuits 90, and the optical waveguides 1 to i (see a process (m) of FIG. 14). Then, a resist is applied onto the entire surface of the SiN film 190, and the applied resist is patterned by photolithography to form a resist pattern 210 (see a process (n) of FIG. 14).

Then, the SiN film 190 is etched using the resist pattern 210 as a mask. In this way, the optical coupling windows 42 and 52 included in the optical transceivers 11 to 1j, 21 to 2j, . . . , i1 to ij are formed on the optical waveguides 1 to i and the photodetectors 70, respectively (see a process (o) of FIG. 15). Although not shown in FIG. 15, the optical coupling window 62 is formed on the photodetector 80 at the same time as when the optical coupling windows 42 and 52 are formed.

Then, a silicon oxide film is formed on the entire surface of the semiconductor substrate 20 by a plasma CVD method, and the silicon oxide film is etched until the optical coupling windows 42, 52, and 62 are exposed. Then, a silicon oxide film 111 having the same thickness as the optical coupling windows 42, 52, and 62 is formed in a region other than the optical coupling windows 42, 52, and 62 (see a process (p) of FIG. 15).

Figure 15:
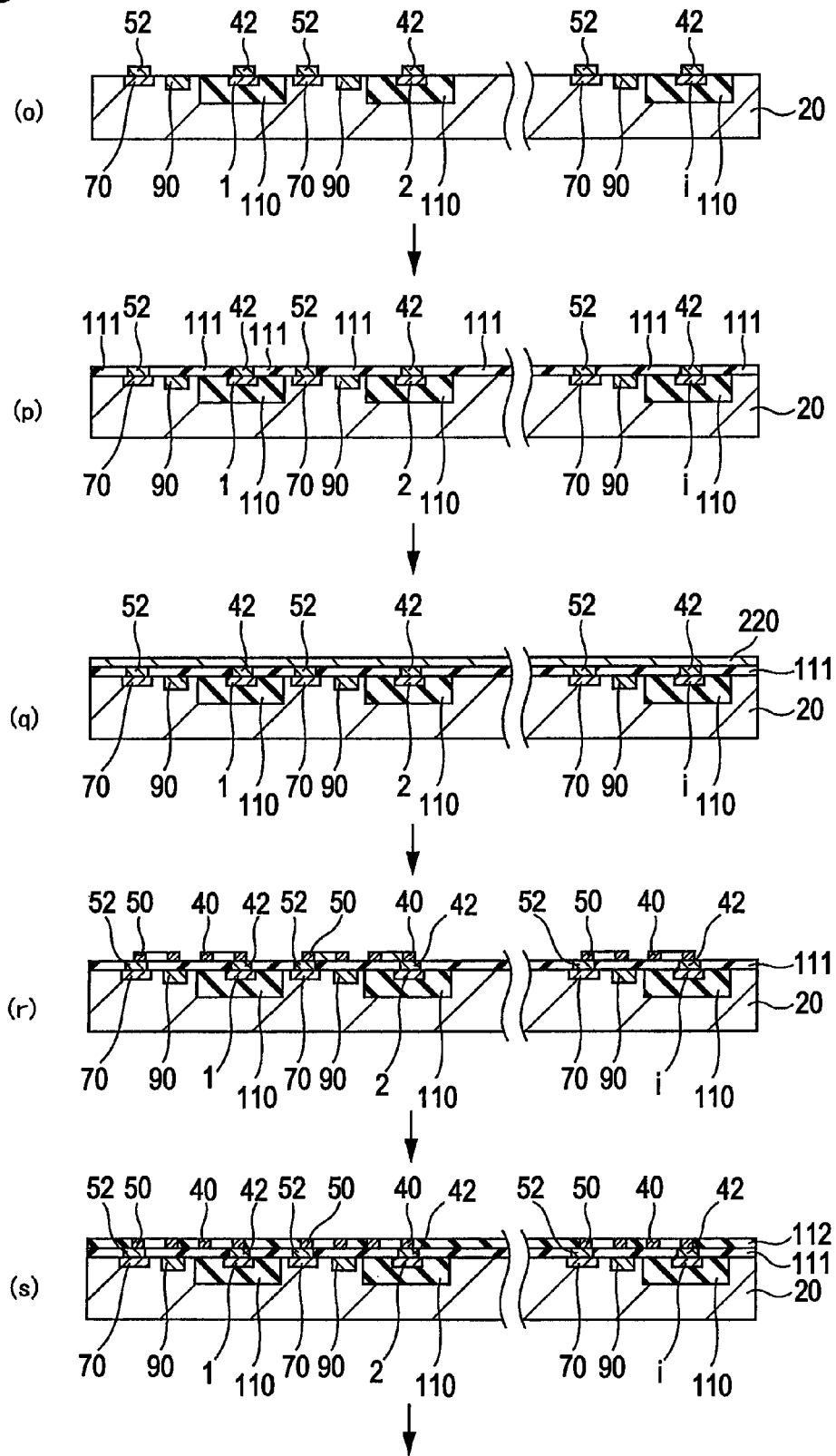
FIG. 15 is a fourth process diagram illustrating the method of manufacturing the optical integrated circuit apparatus shown in FIG. 1.

Subsequently, a film 220 having a three-layer structure of a $SiO_2$ layer, a silicon layer, and a $Si_3N_4$ layer is formed on the entire surface of the semiconductor substrate 20 so as to cover the silicon oxide film 111 and the optical coupling windows 42, 52, and 62 (see a process (q) of FIG. 15).

Then, a resist is applied onto the entire surface of the film 220, and the applied resist is patterned by photolithography. The film 220 is etched using the patterned resist as a mask. In this way, the optical resonators 40 and 50 included in the optical transceivers 11 to 1j, 21 to 2j, . . . , i1 to ij are formed on the optical coupling windows 42 and 52, respectively (see a process (r) of FIG. 15). Although not shown in FIG. 15, the optical resonator 60 is formed on the optical coupling window 62 at the same time as when the optical resonators 40 and 50 are formed.

Then, a silicon oxide film is formed on the entire surface of the semiconductor substrate 20 by a plasma CVD method, and the silicon oxide film is etched until the optical resonators 40, 50, and 60 are exposed. Then, a silicon oxide film 112 having the same thickness as the optical resonators 40, 50, and 60 is formed in a region other than the optical resonators 40, 50, and 60 (see a process (s) of FIG. 15).

Subsequently, a SiN film 230 is formed on the optical resonators 40, 50, and 60 and the silicon oxide film 112 by a sputtering method (see a process (t) of FIG. 16). Then, a resist is applied onto the entire surface of the SiN film 230, and the applied resist is patterned by photolithography. The SiN film 230 is etched using the patterned resist as a mask. In this way, the light emission window 41 and the light incident window 51 included in each of the optical transceivers 11 to 1j, 21 to 2j, . . . , i1 to ij are formed on the optical resonators 40 and 50, respectively (see a process (u) of FIG. 16). Although not shown in FIG. 16, the light incident window 61 is formed on the optical resonator 60 at the same time as when the light emission window 41 and the light incident window 51 are formed.

Figure 16:
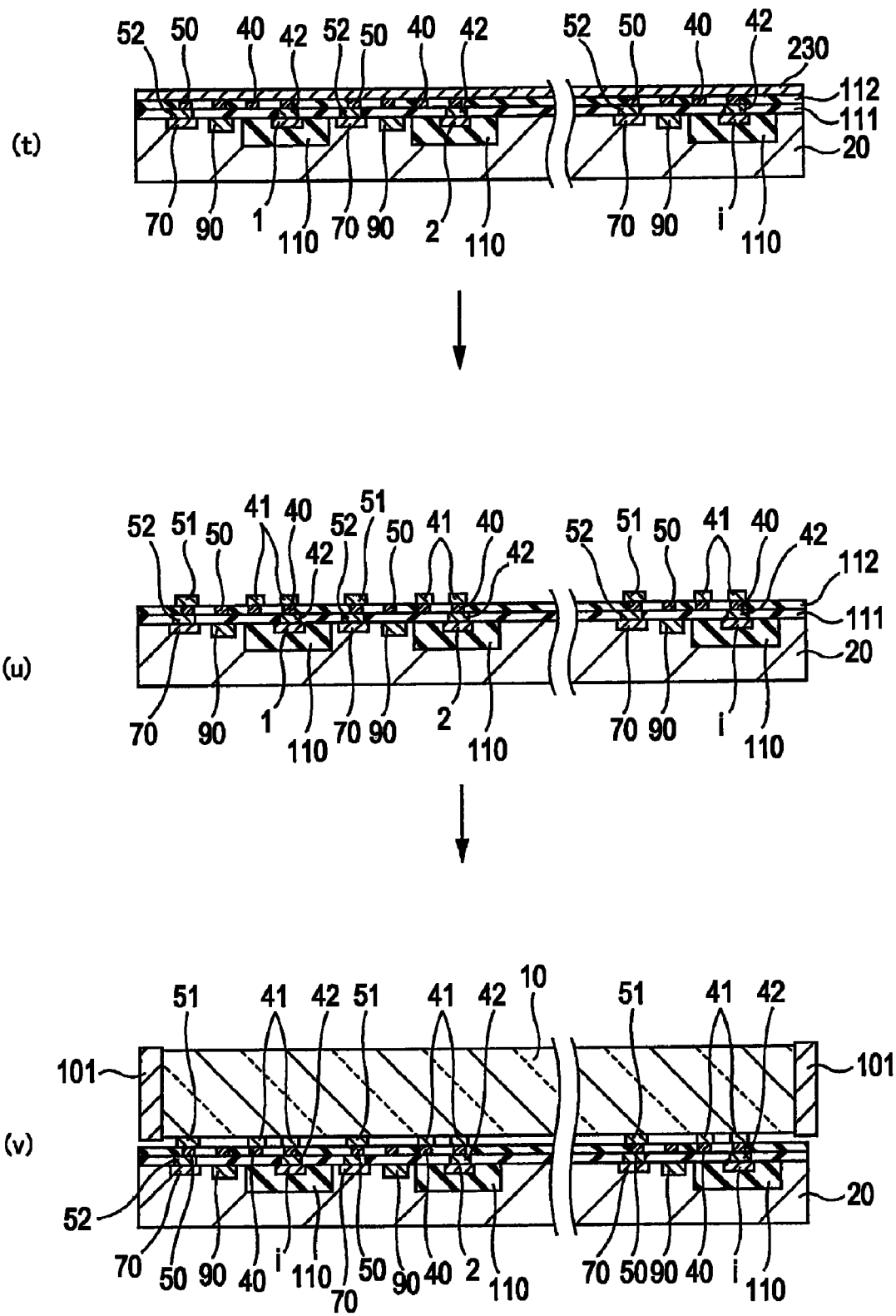
FIG. 16 is a fifth process diagram illustrating the method of manufacturing the optical integrated circuit apparatus shown in FIG. 1.

Then, the optical transmission member 10 surrounded by the light absorbing member 101 is bonded to the semiconductor substrate 20 (see a process (v) of FIG. 16). In this way, the optical integrated circuit apparatus 100 is manufactured.

As described above, it is possible to easily manufacture the optical integrated circuit apparatus 100 using a semiconductor process.

Figure 17:
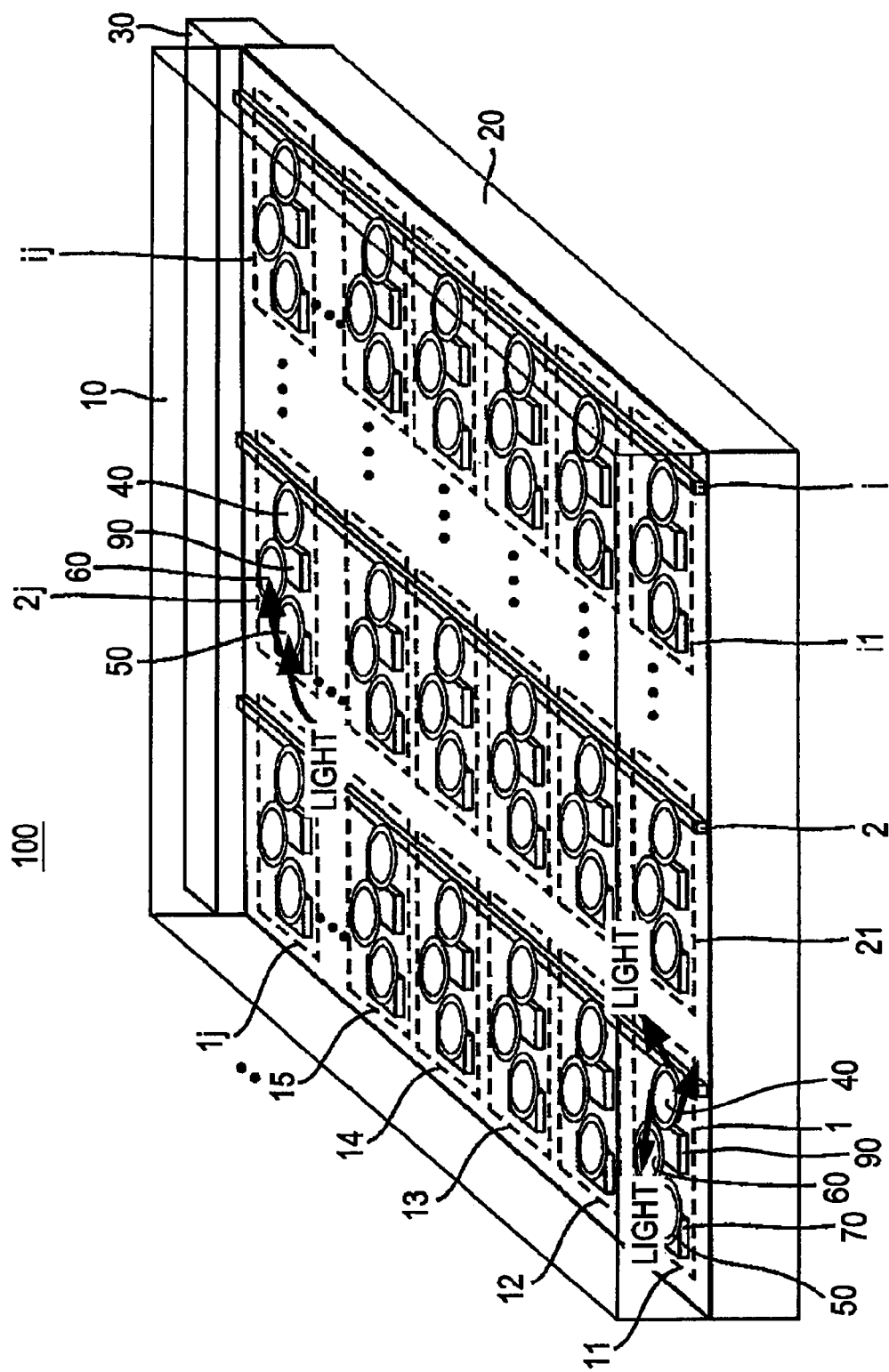
FIG. 17 is a diagram illustrating a signal exchange process in the optical integrated circuit apparatus shown in FIG. 1.

FIG. 17 is a diagram illustrating a signal exchange process in the optical integrated circuit apparatus 100 shown in FIG. 1. In the signal exchange process of the optical integrated circuit apparatus 100, the signal processing circuit 90 of the optical transceiver transmitting signals applies the voltage Vk to the optical resonators 50 and 60 for a predetermined period of time, and transmits signals when the photodetectors 70 and 80 do not detect light traveling through the optical transmission member 10. The optical transceivers other than the optical transceiver transmitting the signals periodically apply the voltage Vk to the optical resonators 50 and 60, and receive light transmitted from other optical transceivers.

Referring to FIG. 17, the lasers LS1 to LSm of the light source 30 generate the light components Lg1 to Lgm having the wavelengths λ1 to λm, and emit the generated light components Lg1 to Lgm to the waveguide 300. The waveguide 300 transmits the light components Lg1 to Lgm received from the lasers LS1 to LSm to the optical waveguides 1 to i. The optical waveguides 1 to i guide the light components Lg1 to Lgm.

When the optical transceiver 11 transmits signals, the signal processing circuit 90 of the optical transceiver 11 applies the voltage Vk to the silicon layer 401 of the optical resonator 40 in correspondence with a transmission signal of "1", and applies no voltage to the silicon layer 401 of the optical resonator 40 in correspondence with a transmission signal of "0".

When the signal processing circuit 90 applies the voltage Vk to the silicon layer 401, the optical resonator 40 of the optical transceiver 11 resonates with a light component Lgk having a wavelength λk among the light components Lg1 to Lgm traveling through the optical waveguide 1, and emits the light component Lgk to the optical transmission member 10. When no voltage is applied from the signal processing circuit 90 to the silicon layer 401, the optical resonator 40 of the optical transceiver 11 does not resonate with any of the light components Lg1 to Lgm traveling through the optical waveguide 1, and emits no light to the optical transmission member 10.

As a result, the light component Lgk having the wavelength λk corresponding to the digital value "1" of the transmission signal is incident on the entire surface of the optical transmission member 10. Specifically, if the digital values "1" are consecutive, the light component Lgk travels through the optical transmission member 10 for a period corresponding to the length of the consecutive digital values "1". If the digital values "1" and the digital values "0" are alternately arranged, a discontinuous light component Lgk travels through the optical transmission member 10.

For example, the signal processing circuit 90 of the optical transceiver 2j applies the voltage Vk to the silicon layers 401 of the optical resonators 50 and 60. Then, the optical resonators 50 and 60 of the optical transceiver 2j resonate with the light components Lgk traveling through the optical transmission member 10, and emit the light component Lgk to the photodetectors 70 and 80, respectively.

The photodetector 70 of the optical transceiver 2j receives a light component Lgk1 emitted from the optical resonator 50, and converts the received light component Lgk1 into a voltage Vout1. Then, the photodetector 70 of the optical transceiver 2j outputs the voltage Vout1 to the signal processing circuit 90. The photodetector 80 of the optical transceiver 2j receives a light component Lgk2 emitted from the optical resonator 60, and converts the received light component Lgk2 into a voltage Vout2. Then, the photodetector 80 of the optical transceiver 2j outputs the voltage Vout2 to the signal processing circuit 90.

In this case, when the photodetectors 70 and 80 of the optical transceiver 2j respectively receive the light components Lgk1 and Lgk2, the photodetectors 70 and 80 output the voltages Vout1 and Vout2 having a level of $V_{Lg}$(>0 V) to the signal processing circuit 90 for a time corresponding to the period for which the light components Lgk1 and Lgk2 are received. When not receiving the light components Lgk1 and Lgk2 from the optical resonators 50 and 60, the photodetectors 70 and 80 output the voltages Vout1 and Vout2 having a level of 0 V to the signal processing circuit 90, respectively.

When respectively receiving the voltages Vout1 and Vout2 having a level of $V_{Lg}$ from the photodetectors 70 and 80, the signal processing circuit 90 of the optical transceiver 2j calculates the sum Vout of the voltages Vout1 and Vout2, and converts the sum Vout into a digital value "1". When the sum Vout is 0 V, the signal processing circuit 90 of the optical transceiver 2j converts the sum Vout into a digital value "0". Then, the signal processing circuit 90 of the optical transceiver 2j demodulates and processes the converted digital value and receives signals from the optical transceiver 11.

The other optical transceivers 12 to 1j, 21 to 2j-1, ..., i1 to ij perform a signal exchange process using the same method as described above.

Therefore, the optical transceivers 11 to 1j, 21 to 2j, ..., i1 to ij use the optical transmission member 10 as a common optical transmission path to perform signal exchange.

Figure 18:
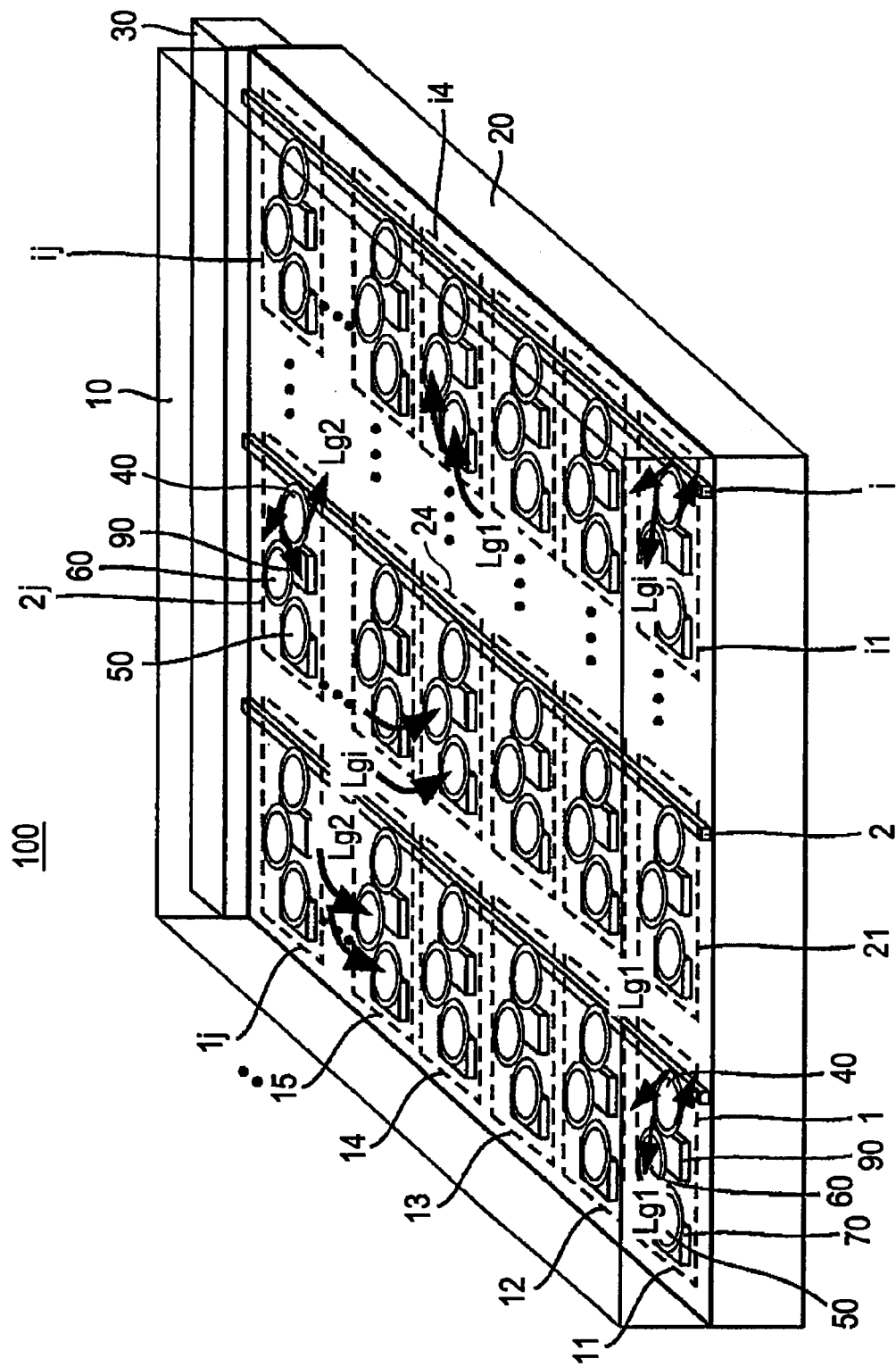
FIG. 18 is a diagram illustrating another signal exchange process in the optical integrated circuit apparatus shown in FIG. 1.

FIG. 18 is a diagram illustrating another signal exchange process in the optical integrated circuit apparatus 100 shown in FIG. 1.

An example in which the number of optical waveguides 1 to i is equal to or smaller than the number of light components Lg1 to Lgm will be described with reference to FIG. 18.

In the following description, it is assumed that the signal processing circuits 90 of the optical transceivers that do not transmit signals sequentially apply voltages V1 to Vi to the optical resonators 50 and 60 for a predetermined period of time and receive signals.

Referring to FIG. 18, the optical transceivers 11 to 1j corresponding to the optical waveguide 1 apply the voltage V1 to the silicon layers 401 of the optical resonators 40, 50, and 60, and transmit or receive signals. The optical transceivers 21 to 2j corresponding to the optical waveguide 2 apply the voltage V2 to the silicon layers 401 of the optical resonators 40, 50, and 60, and transmit or receive signals. Similarly, the optical transceivers i1 to ij corresponding to the optical waveguide i apply the voltage Vi to the silicon layers 401 of the optical resonators 40, 50, and 60, and transmit or receive signals.

While the light components Lg1 to Lgm emitted from the light source 30 travel through the optical waveguides 1 to i, the signal processing circuit 90 of the optical transceiver 11 applies the voltage V1 to the silicon layers 401 of the optical resonators 50 and 60. When the photodetectors 70 and 80 do not detect the light component Lg1, the signal processing circuit 90 applies the voltage V1 to the silicon layer 401 of the optical resonator 40 in correspondence with a transmission signal of "1", and applies no voltage to the silicon layer 401 of the optical resonator 40 in correspondence with a transmission signal of "0".

When the signal processing circuit 90 applies the voltage V1 to the silicon layer 401, the optical resonator 40 of the optical transceiver 11 resonates with a light component Lg1 having a wavelength λ1 among the light components Lg1 to Lgm traveling through the optical waveguide 1, and emits the light component Lg1 to the optical transmission member 10. When no voltage is applied from the signal processing circuit 90 to the silicon layer 401, the optical resonator 40 of the optical transceiver 11 does not resonate with any of the light components Lg1 to Lgm traveling through the optical waveguide 1, and emits no light to the optical transmission member 10.

In this way, the optical transceiver 11 uses the light component Lg1 having the wavelength λ1 to transmit signals.

The signal processing circuit 90 of the optical transceiver 2j applies the voltage V2 to the silicon layers 401 of the optical resonators 50 and 60. When the photodetectors 70 and 80 do not detect a light component Lg2, the signal processing circuit 90 applies the voltage V2 to the silicon layer 401 of the optical resonator 40 in correspondence with a transmission signal of "1", and applies no voltage to the silicon layer 401 of the optical resonator 40 in correspondence with a transmission signal of "0".

When the signal processing circuit 90 applies the voltage V2 to the silicon layer 401, the optical resonator 40 of the optical transceiver 2j resonates with the light component Lg2 having a wavelength λ2 among the light components Lg1 to Lgm traveling through the optical waveguide 2, and emits the light component Lg2 to the optical transmission member 10. When no voltage is applied from the signal processing circuit 90 to the silicon layer 401, the optical resonator 40 of the optical transceiver 2j does not resonate with any of the light components Lg1 to Lgm traveling through the optical waveguide 2, and emits no light to the optical transmission member 10.

In this way, the optical transceiver 2j uses the light component Lg2 having the wavelength λ2 to transmit signals.

The signal processing circuit 90 of the optical transceiver i1 applies a voltage Vi to the silicon layers 401 of the optical resonators 50 and 60. When the photodetectors 70 and 80 do not detect a light component Lgi, the signal processing circuit 90 applies the voltage Vi to the silicon layer 401 of the optical resonator 40 in correspondence with a transmission signal of "1," and applies no voltage to the silicon layer 401 of the optical resonator 40 in correspondence with a transmission signal of "0".

When the signal processing circuit 90 applies the voltage Vi to the silicon layer 401, the optical resonator 40 of the optical transceiver i1 resonates with the light component Lgi having the wavelength λi among the light components Lg1 to Lgm traveling through the optical waveguide i, and emits the light component Lgi to the optical transmission member 0. When no voltage is applied from the signal processing circuit 90 to the silicon layer 401, the optical resonator 40 of the optical transceiver i1 does not resonate with any of the light components Lg1 to Lgm traveling through the optical waveguide i, and emits no light to the optical transmission member 10.

In this way, the optical transceiver i1 uses the light component Lgi having the wavelength λi to transmit signals.

The light components Lg1, Lg2, and Lgi respectively emitted from the optical transceivers 11, 2j, and i1 travel through the optical transmission member 10 in all directions. In this case, since the light components Lg1, Lg2, and Lgi have different wavelengths, the light components do not interfere with each other.

For example, when the signal processing circuit 90 of the optical transceiver i4 applies the voltage V1 to the silicon layers 401 of the optical resonators 50 and 60 for a predetermined period of time, the optical resonators 50 and 60 of the optical transceiver i4 resonate with the light component Lg1 traveling through the optical transmission member 10, and emit the light component Lg1 to the photodetectors 70 and 80, respectively. When receiving the light component Lg1, the photodetectors 70 and 80 of the optical transceiver i4 respectively generate voltages Vout1 and Vout2 having a level of $V_{Lg}$ and output the generated voltages to the signal processing circuit 90. When not receiving the light component Lg1, the photodetectors 70 and 80 generate voltages Vout1 and Vout2 having a level of 0 V and output the generated voltages to the signal processing circuit 90.

When respectively receiving the voltages Vout1 and Vout2 having a level of $V_{Lg}$ from the photodetectors 70 and 80, the signal processing circuit 90 of the optical transceiver i4 calculates the sum Vout of the voltages Vout1 and Vout2, and converts the sum Vout into a digital value "1". When respectively receiving the voltages Vout1 and Vout2 having a level of 0 V from the photodetectors 70 and 80, the signal processing circuit 90 converts the sum Vout into a digital value "0". Then, the signal processing circuit 90 of the optical transceiver i4 demodulates and processes the converted digital value and receives signals.

When the signal processing circuit 90 of the optical transceiver 15 applies the voltage V2 to the silicon layers 401 of the optical resonators 50 and 60 for a predetermined period of time, the optical resonators 50 and 60 of the optical transceiver 15 resonate with the light component Lg2 traveling through the optical transmission member 10, and emit the light component Lg2 to the photodetectors 70 and 80, respectively. When receiving the light component Lg2, the photodetectors 70 and 80 of the optical transceiver 15 respectively generate voltages Vout1 and Vout2 having a level of $V_{Lg}$ and output the generated voltages to the signal processing circuit 90. When not receiving the light component Lg2, the photodetectors 70 and 80 generate voltages Vout1 and Vout2 having a level of 0 V and output the generated voltages to the signal processing circuit 90.

When respectively receiving the voltages Vout1 and Vout2 having a level of $V_{Lg}$ from the photodetectors 70 and 80, the signal processing circuit 90 of the optical transceiver 15 calculates the sum Vout of the voltages Vout1 and Vout2, and converts the sum Vout into a digital value "1". When respectively receiving the voltages Vout1 and Vout2 having a level of 0 V from the photodetectors 70 and 80, the signal processing circuit 90 converts the sum Vout into a digital value "0". Then, the signal processing circuit 90 of the optical transceiver 15 demodulates and processes the converted digital value and receives signals.

When the signal processing circuit 90 of the optical transceiver 24 applies the voltage Vi to the silicon layers 401 of the optical resonators 50 and 60 for a predetermined period of time, the optical resonators 50 and 60 of the optical transceiver 24 resonate with the light component Lgi traveling through the optical transmission member 10, and emit the light component Lgi to the photodetectors 70 and 80, respectively. When receiving the light component Lgi, the photodetectors 70 and 80 of the optical transceiver 24 respectively generate voltages Vout1 and Vout2 having a level of $V_{Lg}$ and output the generated voltages to the signal processing circuit 90. When not receiving the light component Lgi, the photodetectors 70 and 80 generate voltages Vout1 and Vout2 having a level of 0 V and output the generated voltages to the signal processing circuit 90. When respectively receiving the voltages Vout1 and Vout2 having a level of $V_{Lg}$ from the photodetectors 70 and 80, the signal processing circuit 90 of the optical transceiver 24 calculates the sum Vout of the voltages Vout1 and Vout2, and converts the sum Vout into a digital value "1". When respectively receiving the voltages Vout1 and Vout2 having a level of 0 V from the photodetectors 70 and 80, the signal processing circuit 90 converts the sum Vout into a digital value "0". Then, the signal processing circuit 90 of the optical transceiver 24 demodulates and processes the converted digital value and receives signals.

The optical transceivers other than the optical transceivers 11, 2j, i1, i4, 15, and 24 perform a signal exchange process using the same method as described above.

As described above, according to this embodiment, it is possible to simultaneously emit a plurality of light components Lg1, Lg2, and Lgi to the optical transmission member 10 to perform signal exchange.

Figure 19:
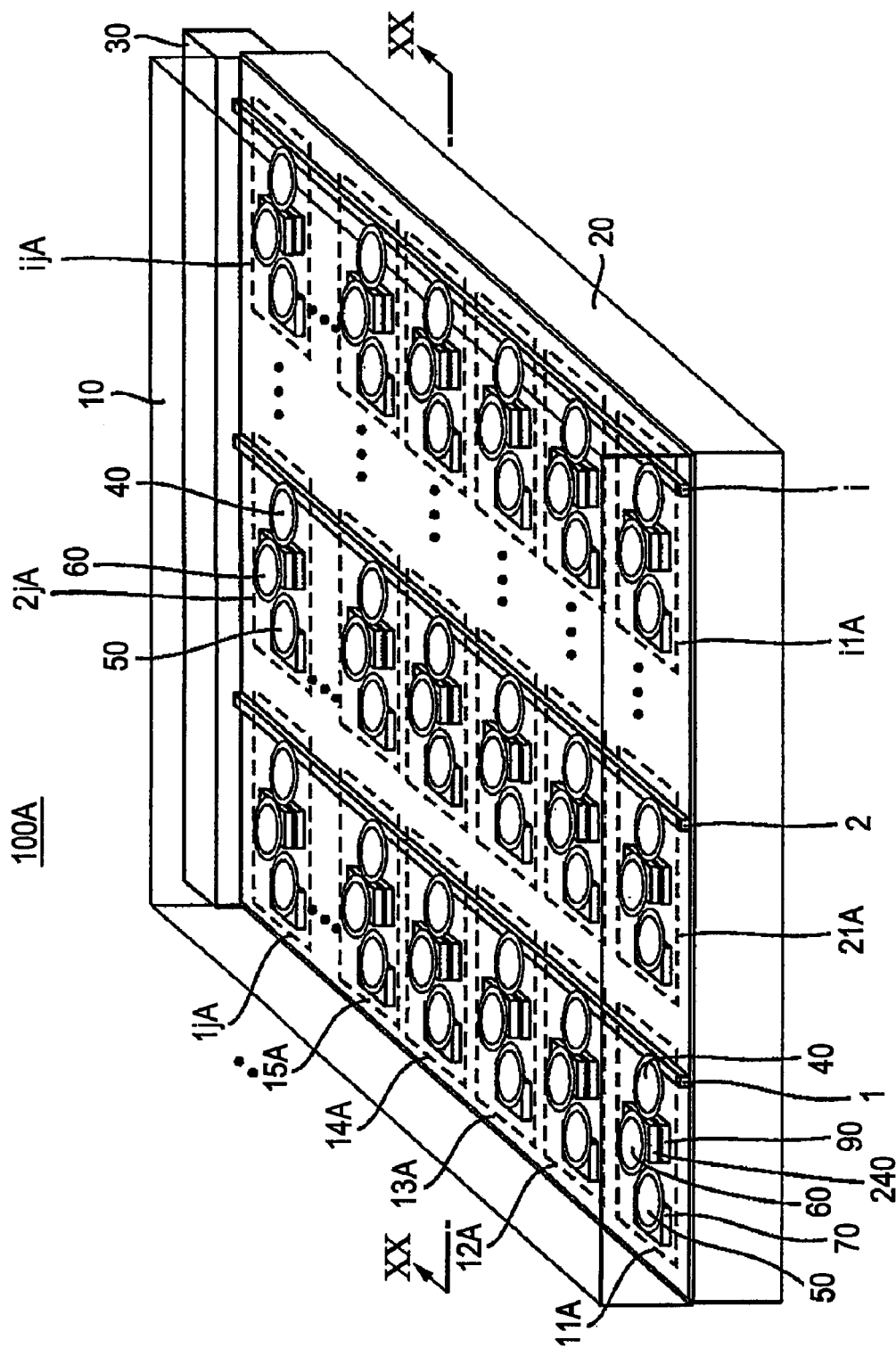
FIG. 19 is a perspective view illustrating an optical integrated circuit apparatus according to another embodiment.

FIG. 19 is a perspective view illustrating an optical integrated circuit apparatus according to another embodiment. The optical integrated circuit apparatus according to this embodiment may be an optical integrated circuit apparatus 100A shown in FIG. 19.

Referring to FIG. 19, the structure of the optical integrated circuit apparatus 100A is similar to that of the optical integrated circuit apparatus 100 shown in FIG. 1 except that optical transceivers 11A to 1jA, 21A to 2jA, . . . , i1A to ijA are replaced with the optical transceivers 11 to 1j, 21 to 2j, . . . , i1 to ij of the optical integrated circuit apparatus 100.

The optical transceivers 11A to 1jA are provided to correspond to an optical waveguide 1, and the optical transceivers 21A to 2jA are provided to correspond to an optical waveguide 2. Similarly, the optical transceivers i1A to ijA are provided to correspond to an optical waveguide i.

The structure of the optical transceiver 11A is similar to that of the optical transceiver 11 shown in FIG. 2 except that a photovoltaic element 240 is additionally provided. Each of the optical transceivers 12A to 1jA, 21A to 2jA, . . . , i1A to ijA has the same structure as the optical transceiver 11A.

Figure 20:
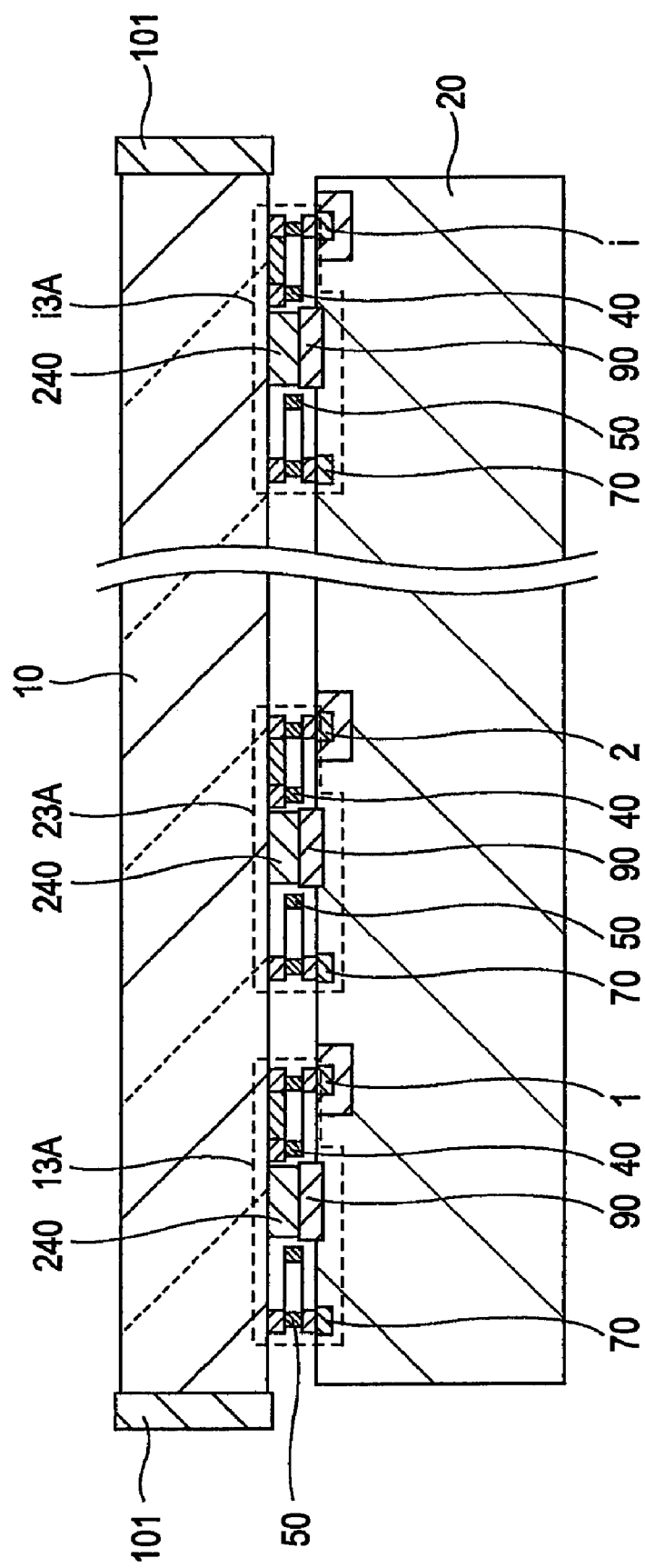
FIG. 20 is a cross-sectional view illustrating the optical integrated circuit apparatus taken along the line XX-XX of FIG. 19.

FIG. 20 is a cross-sectional view illustrating the optical integrated circuit apparatus 100A taken along the line XX-XX of FIG. 19. Referring to FIG. 20, in each of the optical transceivers 13A, 23A, and i3A, the photovoltaic element 240 is arranged on the signal processing circuit 90 so as to contact the optical transmission member 10, and is electrically connected to the signal processing circuit 90.

For example, the photovoltaic element 240 has a p-n junction of p-type Si and n-type Si. The photovoltaic element 240 is arranged on the signal processing circuit 90 such that the n-type Si contacts the optical transmission member 10.

Since Si has a refractive index that is larger than that of SiN forming the optical transmission member 10, light traveling to the photovoltaic element 240 is incident on the photovoltaic element 240. Then, the photovoltaic element 240 receives light traveling through the optical transmission member 10, converts the received light into electricity, and supplies the electricity to the signal processing circuit 90.

In the optical integrated circuit apparatus 100A, the signal processing circuit 90 is operated by the electricity received from the photovoltaic element 240. That is, in the optical integrated circuit apparatus 100A, the signal processing circuit 90 uses the photovoltaic element 240 as a power supply.

In the optical integrated circuit apparatus 100A, each of the optical transceivers 11A to 1jA, 21A to 2jA, . . . , i1A to ijA exchanges signals with other optical transceivers using the same method as described with reference to FIGS. 17 and 18.

The photovoltaic element 240 of each of the optical transceivers 11A to 1jA, 21A to 2jA, . . . , i1A to ijA receives light traveling through the optical transmission member 10, converts the received light into electricity, and supplies the electricity to the signal processing circuit 90, regardless of the reception of light by the photodetectors 70 and 80. That is, even though the corresponding signal processing circuit 90 does not transmit nor receive signals, the photovoltaic element 240 in each of the optical transceivers 11A to 1jA, 21A to 2jA, . . . , i1A to ijA receives light traveling through the optical transmission member 10, converts the received light into electricity, and supplies the converted electricity to the signal processing circuit 90, when other optical transceivers exchange signals.

Therefore, in the optical integrated circuit apparatus 100A, each of the optical transceivers 11A to 1jA, 21A to 2jA, . . . , i1A to ijA converts light traveling through the optical transmission member 10 into electricity, regardless of whether signals are received. Therefore, it is possible to reduce energy consumption.

The optical integrated circuit apparatus 100A shown in FIGS. 19 and 20 is manufactured by the processes (a) to (v) shown in FIGS. 12 to 16. In this case, in the process (l) shown in FIG. 14, after the signal processing circuit 90 is formed on one main surface of the semiconductor substrate 20, a p-type Si layer and an n-type Si layer are sequentially formed on the signal processing circuit 90 to form the photovoltaic element 240.

Figure 21:
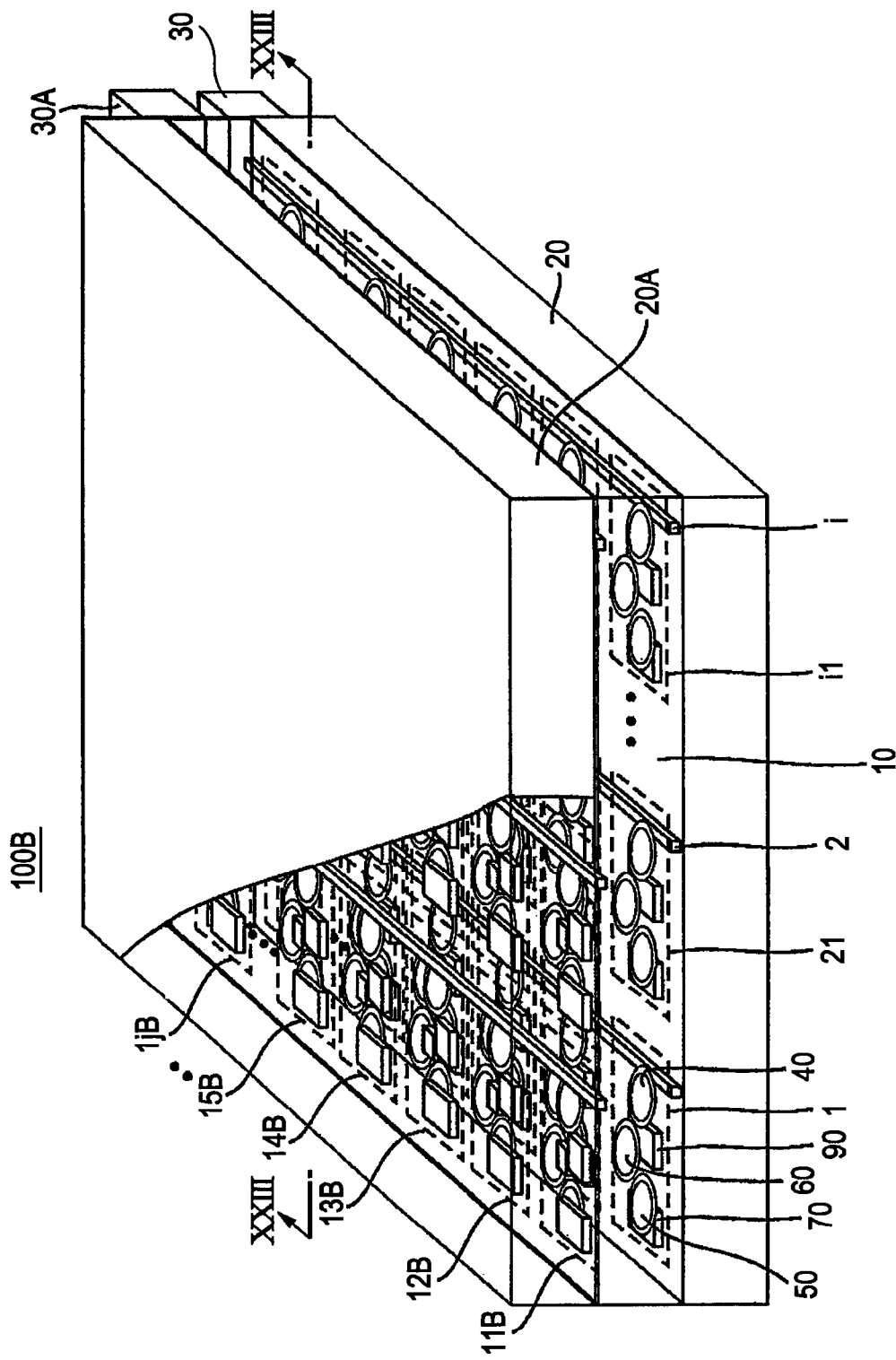
FIG. 21 is a perspective view illustrating an optical integrated circuit apparatus according to still another embodiment.
Figure 22:
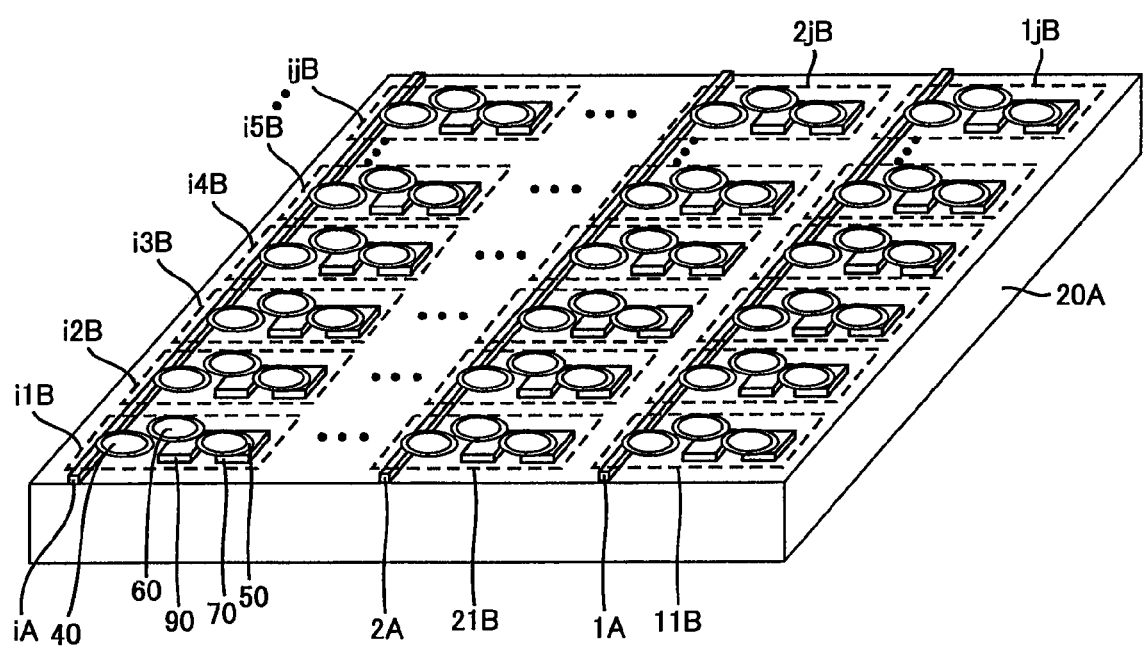
FIG. 22 is a perspective view illustrating a semiconductor substrate shown in FIG. 21, as viewed from an optical transmission member.

FIG. 21 is a perspective view illustrating an optical integrated circuit apparatus according to still another embodiment. FIG. 22 is a perspective view illustrating a semiconductor substrate 20A shown in FIG. 21, as viewed from the optical transmission member 10. FIG. 23 is a cross-sectional view illustrating an optical integrated circuit apparatus 100B taken along the line XXIII-XXIII of FIG. 21.

The optical integrated circuit apparatus according to this embodiment may be the optical integrated circuit apparatus 100B shown in FIGS. 21 to 23. Referring to FIGS. 21 to 23, the structure of the optical integrated circuit apparatus 100B is similar to that of the optical integrated circuit apparatus 100 shown in FIG. 1 except that the semiconductor substrate 20A, a light source 30A, optical waveguides 1A to iA, and optical transceivers 11B to 1jB, 21B to 2jB, . . . , i1B to ijB are additionally provided.

The semiconductor substrate 20A is formed of n-type Si, and is arranged adjacent to the optical transmission member 10 so as to face the semiconductor substrate 20.

The light source 30A is provided on one side surface of the semiconductor substrate 20A. The optical waveguides 1A to iA are arranged on one main surface of the semiconductor substrate 20A, similar to the optical waveguides 1 to i.

The optical transceivers 11B to 1jB are provided to correspond to the optical waveguide 1A, and the optical transceivers 21B to 2jB are provided to correspond to the optical waveguide 2A. Similarly, the optical transceivers i1B to ijB are provided to correspond to the optical waveguide iA. Each of the optical transceivers 11B to 1jB, 21B to 2jB, . . . , i1B to ijB has the same structure as the optical transceiver 11.

The light source 30A has the same structure as the light source 30. That is, the light source 30A generates light components Lg1 to Lgm having wavelengths λ1 to λm or a continuous light component Lgc in a predetermined wavelength range, and emits the light components Lg1 to Lgm or the continuous light component Lgc to the optical waveguides 1A to iA.

Similar to the optical transceivers 11 to 1j, 21 to 2j, . . . , i1 to ij, the optical transceivers 11B to 1jB, 21B to 2jB, . . . , i1B to ijB emit the light components Lg1 to Lgm or a portion of the continuous light component Lgc traveling through the optical waveguides 1A to iA to the optical transmission member 10, and receives light traveling through the optical transmission member 10 using the photodetectors 70 and 80 to perform signal exchange, using the same method as described above.

In the optical integrated circuit apparatus 100B, it is possible to perform signal exchange among the optical transceivers 11 to 1j, 21 to 2j, . . . , i1 to ij and among the optical transceivers 11B to 1jB, 21B to 2jB, . . . , i1B to ijB. In addition, in the optical integrated circuit apparatus 100B, it is possible to perform signal exchange between any one of the optical transceivers 11 to 1j, 21 to 2j, . . . , i1 to ij provided on one surface of the optical transmission member 10 and any one of the optical transceivers 11B to 2jB, 21B to 2jB, . . . , i1B to ijB provided on the other surface of the optical transmission member 10.

Therefore, in the optical integrated circuit apparatus 100B, it is possible to connect a larger number of optical transceivers than that in the optical integrated circuit apparatus 100 or 100A.

As described above, in the optical integrated circuit apparatus 100B, the optical transceivers 11 to 1j, 21 to 2j, . . . , i1 to ij and the optical transceivers 11B to 1jB, 21B to 2jB, ..., i1B to ijB are provided on two surfaces of the optical transmission member 10.

In the optical integrated circuit apparatus 100B, each of the optical transceivers 11 to 1j, 21 to 2j, ..., i1 to ij and the optical transceivers 11B to 1jB, 21B to 2jB, ..., i1B to ijB may further include the photovoltaic element 240.

As described above, in the optical integrated circuit apparatuses 100, 100A, and 100B, the optical transceivers 11 to 1j, 21 to 2j, ..., i1 to ij, the optical transceiver 11A to 1jA, 21A to 2jA, ..., i1A to ijA, and the optical transceivers 11 to 1j, 21 to 2j, ..., i1 to ij, 11B to 1jB, 21B to 2jB, ..., i1B to ijB use the optical transmission member 10 as a common optical transmission path to transmit or receive signals.

Therefore, according to the above-described embodiments, two arbitrary optical transceivers can perform communication with each other. In addition, it is possible to arbitrarily connect the optical transceivers 11 to 1j, 21 to 2j, ..., i1 to ij, the optical transceivers 11A to 1jA, 21A to 2jA, ..., i1A to ijA, and the optical transceivers 11 to 1j, 21 to 2j, ..., i1 to ij, 11B to 1jB, 21B to 2jB, ..., i1B to ijB through the optical transmission member.

In the above-described embodiments, the optical resonators 40, 50, and 60 form an 'optical switch member'.

Further, in the above-described embodiments, the optical resonator 40 forms a 'first optical resonator', and the optical resonators 50 and 60 form a 'second optical resonator'.

In the above-described embodiments, j optical resonators 40 included in the optical transceivers 11 to 1j, j optical resonators 40 included in the optical transceivers 21 to 2j, and j optical resonators 40 included in the optical transceivers i1 to ij form 'i first optical resonator groups'.

In the above-described embodiments, j optical resonators 50 and 60 included in the optical transceivers 11 to 1j, j optical resonators 50 and 60 included in the optical transceivers 21 to 2j, ..., and j optical resonators 50 and 60 included in the optical transceivers i1 to ij form 'i second optical resonator groups'.

In the above-described embodiments, j photodetectors 70 and 80 included in the optical transceivers 11 to 1j, j photodetectors 70 and 80 included in the optical transceivers 21 to 2j, ..., and j photodetectors 70 and 80 included in the optical transceivers i1 to ij form 'i photodetector groups'.

In the above-described embodiments, j signal processing circuits 90 included in the optical transceivers 11 to 1j, j signal processing circuits 90 included in the optical transceivers 21 to 2j, ..., and j signal processing circuits 90 included in the optical transceivers i1 to ij form 'i signal processing circuit groups'.

In the above-described embodiments, j optical resonators 40 included in the optical transceivers 11A to 1jA, j optical resonators 40 included in the optical transceivers 21A to 2jA, ..., and j optical resonators 40 included in the optical transceivers i1A to ijA form 'i first optical resonator groups'.

In the above-described embodiments, j optical resonators 50 and 60 included in the optical transceivers 11A to 1jA, j optical resonators 50 and 60 included in the optical transceivers 21A to 2jA, ..., and j optical resonators 50 and 60 included in the optical transceivers i1A to ijA form 'i second optical resonator groups'.

In the above-described embodiments, j photodetectors 70 and 80 included in the optical transceivers 11A to 1jA, j photodetectors 70 and 80 included in the optical transceivers 21A to 2jA, ..., and j photodetectors 70 and 80 included in the optical transceivers i1A to ijA form 'i photodetector groups'.

In the above-described embodiments, j signal processing circuits 90 included in the optical transceivers 11A to 1jA, j signal processing circuits 90 included in the optical transceivers 21A to 2jA, ..., and j signal processing circuits 90 included in the optical transceivers i1A to ijA form 'i signal processing circuit groups'.

In the above-described embodiments, j optical resonators 40 included in the optical transceivers 11B to 1jB, j optical resonators 40 included in the optical transceivers 21B to 2jB, ..., and j optical resonators 40 included in the optical transceivers i1B to ijB form 'i first optical resonator groups'.

In the above-described embodiments, j optical resonators 50 and 60 included in the optical transceivers 11B to 1jB, j optical resonators 50 and 60 included in the optical transceivers 21B to 2jB, ..., and j optical resonators 50 and 60 included in the optical transceivers i1B to ijB form 'i second optical resonator groups'.

In the above-described embodiments, j photodetectors 70 and 80 included in the optical transceivers 11B to 1jB, j photodetectors 70 and 80 included in the optical transceivers 21B to 2jB, ..., and j photodetectors 70 and 80 included in the optical transceivers i1B to ijB form 'i photodetector groups'.

In the above-described embodiments, j signal processing circuits 90 included in the optical transceivers 11B to 1jB, j signal processing circuits 90 included in the optical transceivers 21B to 2jB, ..., and j signal processing circuits 90 included in the optical transceivers i1B to ijB form 'i signal processing circuit groups'.

In the above-described embodiments, 2j optical resonators 40 included in the optical transceivers 11 to 1j and 11B to 1jB, 2j optical resonators 40 included in the optical transceivers 11 to 1j and 21B to 2jB, ..., and 2j optical resonators 40 included in the optical transceivers 11 to 1j and 11B to ijB form 'i first optical resonator groups'.

In the above-described embodiments, 2j optical resonators 50 and 60 included in the optical transceivers 11 to 1j and 11B to 1jB, 2j optical resonators 50 and 60 included in the optical transceivers 11 to 1j and 21B to 2jB, ..., and 2j optical resonators 50 and 60 included in the optical transceivers 11 to 1j and i1B to ijB form 'i second optical resonator groups'.

In the above-described embodiments, 2j photodetectors 70 and 80 included in the optical transceivers 11 to 1j and 11B to 1jB, 2j photodetectors 70 and 80 included in the optical transceivers 11 to 1j and 21B to 2jB, ..., and 2j photodetectors 70 and 80 included in the optical transceivers 11 to 1j and i1B to ijB form 'i photodetector groups'.

In the above-described embodiments, 2j signal processing circuits 90 included in the optical transceivers 11 to 1j and 11B to 1jB, 2j signal processing circuits 90 included in the optical transceivers 11 to 1j and 21B to 2jB, ..., and 2j signal processing circuits 90 included in the optical transceivers 11 to 1j and i1B to ijB form 'i signal processing circuit groups'.

It should be understood that the above-described embodiments are not limitative, but illustrative in all aspects. The scope is defined by the appended claims rather than by the description preceding them, and all changes and modifications that fall within meets and bounds of the claims, or equivalences of such meets and bounds are therefore intended to be embraced by the claims.

The representative embodiments described herein can be applied to an optical integrated circuit apparatus in which two arbitrary optical transceivers can directly communicate with each other. In addition, the representative embodiments described herein can be applied to an optical integrated circuit apparatus in which two arbitrary optical transceivers can communicate with each other at the same time.

What is claimed is:

1. An optical integrated circuit device comprising:
a light transmission member transmitting light, the light transmission member being in the form of a flat plate;
a plurality of light transmission/reception units being disposed on a semiconductor substrate, and transmitting/receiving a signal to/from each other by sharing the light transmission member for use as a light transmission path; and
an optical waveguide propagating light emitted from a light source; wherein
each of the plurality of light transmission/reception units includes:
an optical detection unit detecting light in the light transmission member; and
an optical switch member guiding light in the optical waveguide to the light transmission member, and guiding light in the light transmission member to the optical detection unit; wherein
the optical switch member includes:
a first optical resonance member formed into the shape of a ring and disposed, in the proximity of the light transmission member and substantially parallel thereto, between the light transmission member and the optical waveguide, the first optical resonance member resonating with light propagating through the optical waveguide when a voltage is applied;
an optical emission member formed into the same shape as that of the first optical resonance member and disposed between the light transmission member and the first optical resonance member in a manner where contact is made with the first optical resonance member, the optical emission member guiding, to the light transmission member, resonant light propagating trough the first optical resonance member;
a second optical resonance member formed into the shape of a ring and disposed in the proximity of the light transmission member and substantially parallel thereto in a position apart from the first optical resonance member, the second optical resonance member resonating with light propagating through the light transmission member when the voltage is applied, and guiding the resonant light to the optical detection unit; and
an optical reception member disposed between the light transmission member and the second optical resonance member in a manner where contact is made with the second optical resonance member, the optical reception member guiding, to the second optical resonance member, light propagating through the light transmission member; wherein
each of the first and second optical resonance members includes:
a silicon layer;
a first stress applying layer being formed so as to contact the silicon layer on one side of the silicon layer, and applying a stress to the silicon layer from a first direction in a planar direction of the semiconductor substrate; and
a second stress applying layer being formed so as to contact the silicon layer on the other side of the silicon layer, and applying a stress to the silicon layer from a second direction opposite to the first direction in a planar direction of the semiconductor substrate.

2. The optical integrated circuit device according to claim 1, wherein
the second optical resonance member includes first and second optical resonators disposed away from each other in a planar direction of the semiconductor substrate; wherein
the optical reception member includes
a first optical reception member disposed in a manner where contact is made with the first optical resonator and
a second optical reception member making contact with the second optical resonator and rotated, in a planar direction of the semiconductor substrate substantially 90 degrees from a position of the first optical reception member; wherein
the optical detection unit includes:
a first optical detector detecting resonant light propagating through the first optical resonator; and
a second optical detector detecting resonant light propagating through the second optical resonator.

3. The optical integrated circuit device according to claim 2, wherein
each of the plurality of light transmission/reception units further includes a signal processing circuit receiving a signal by calculating the sum of a first output signal output from the first optical detector and a second output signal output from the second optical detector.

4. The optical integrated circuit device according to claim 3, wherein
the signal processing circuit further transmits a signal via the light transmission member in response to application or non-application of the voltage to the first optical resonance member.

5. The optical integrated circuit device according to claim 1, wherein
light propagating through the optical waveguide is a plurality of light beams having a plurality of discrete wavelengths or continuous wavelengths in a given range; wherein
when the voltage is applied, the first optical resonance member resonates with one of the plurality of light beams forming light propagating through the optical waveguide, the one of the plurality of light beams having a wavelength.

6. The optical integrated circuit device according to claim 1, wherein
the first stress applying layer is made of a silicon nitride layer, and
the second stress applying layer is a silicon oxide layer.

7. The optical integrated circuit device according to claim 1, wherein
the light transmission member includes a transparent material having a refraction index larger than that of air.

8. An optical integrated circuit device comprising:
a light transmission member transmitting light, the light transmission member being in the form of a flat plate; and
a semiconductor substrate disposed in the proximity of the light transmission member and substantially parallel thereto; wherein
the semiconductor substrate includes:
i (i is a positive integer) optical waveguides propagating light from a light source, the optical waveguides being formed on a main surface on the side of the light transmission member;
i first optical resonance member groups disposed corresponding to the i optical waveguides, each of the first optical resonance member groups being formed on one optical waveguide in a manner where contact is made with the one optical waveguide;

i optical detection unit groups disposed corresponding to the i optical waveguides;

i second optical resonance member groups disposed corresponding to the i optical waveguides, each of the second optical resonance member groups being formed on one optical detection unit group in a manner where contact is made with the one optical detection unit group; and i signal processing circuit groups disposed corresponding to the i optical waveguides; wherein each of the i first optical resonance member groups includes:

j (j is 2 or a larger integer) first optical resonance members each formed into the shape of a ring; and j optical emission members disposed corresponding to the j first optical resonance members, each of the j optical emission members being in the same shape as that of the first optical resonance member and disposed between the light transmission member and the first optical resonance member in a manner where contact is made with the first optical resonance member; wherein each of the i optical detection unit groups includes j optical detection units; wherein each of the i second optical resonance member groups includes:

j second optical resonance members each formed into the shape of a ring; and j optical reception members disposed corresponding to the j second optical resonance members, each of the j optical reception members being disposed between the light transmission member and the second optical resonance member in a manner where contact is made with the second optical resonance member; wherein each of the i signal processing circuit groups includes j signal processing circuits; wherein when a voltage is applied, each of the j first optical resonance members guides, to the light transmission member via the optical emission member, one of light beams propagating through the optical waveguide, the one of light beams having a wavelength resonating with the first optical resonance member; wherein when a voltage is applied, each of the j second optical resonance members guides, to the optical detection unit, one of light beams received from the light transmission member via the optical reception member, the one of light beams having a wavelength resonating with the second optical resonance member; wherein each of the j optical detection units detects a light beam guided by the second optical resonance member; wherein each of the j signal processing circuits transmits a signal in response to application or non-application of a voltage to the first optical resonance member and processes a detection signal detected by the optical detection unit in response to application or non-application of a voltage to the second optical resonance member; wherein each of the j first and second optical resonance members includes:

a silicon layer;

a first stress applying layer being formed so as to contact the silicon layer on one side of the silicon layer, and applying a stress to the silicon layer from a first direction in a planar direction of the semiconductor substrate; and a second stress applying layer being formed so as to contact the silicon layer on the other side of the silicon layer, and applying a stress to the silicon layer from a second direction opposite to the first direction in a planar direction of the semiconductor substrate.

9. The optical integrated circuit device according to claim 8, wherein each of the j second optical resonance members includes first and second optical resonators disposed away from each other in a planar direction of the semiconductor substrate; wherein each of the j optical reception members includes:

a first optical reception member disposed in a manner where contact is made with the first optical resonator; and a second optical reception member in contact with the second optical resonator and rotated, in a planar direction of the semiconductor substrate, substantially 90 degrees from a position of the first optical reception member; wherein each of the j optical detection units includes:

a first optical detector detecting resonant light propagating through the first optical resonator; and a second optical detector detecting resonant light propagating through the second optical resonator.

10. The optical integrated circuit device acceding to claim 9, wherein each of the j signal processing circuits receives a signal by calculating the sum of a first output signal output from the first optical detector and a second output signal output from the second optical detector.

11. The optical integrated circuit device according to claim 8, wherein the first stress applying layer is made of a silicon nitride layer, and the second stress applying layer is a silicon oxide layer.

* * * * *

UNITED STATES PATENT AND TRADEMARK OFFICE
CERTIFICATE OF CORRECTION

| | | |
|---|---|---|
| PATENT NO. | : 7,907,847 B2 | Page 1 of 1 |
| APPLICATION NO. | : 12/328341 | |
| DATED | : March 15, 2011 | |
| INVENTOR(S) | : Tanushi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Twenty-eighth Day of June, 2011

David J. Kappos
*Director of the United States Patent and Trademark Office*